(12) United States Patent
Kuhara et al.

(10) Patent No.: US 12,181,894 B2
(45) Date of Patent: Dec. 31, 2024

(54) UNMANNED AIRCRAFT, CONTROL METHOD, AND RECORDING MEDIUM

(71) Applicant: Panasonic Intellectual Property Management Co., Ltd., Osaka (JP)

(72) Inventors: Shunsuke Kuhara, Osaka (JP); Kazunobu Konishi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 725 days.

(21) Appl. No.: 16/929,755

(22) Filed: Jul. 15, 2020

(65) Prior Publication Data

US 2020/0348697 A1    Nov. 5, 2020

Related U.S. Application Data

(63) Continuation of application No. PCT/JP2019/034144, filed on Aug. 30, 2019.

(30) Foreign Application Priority Data

Nov. 28, 2018   (JP) .................................. 2018-222052

(51) Int. Cl.
*G05D 1/00*    (2024.01)
*B64U 10/13*    (2023.01)
(Continued)

(52) U.S. Cl.
CPC ............. *G05D 1/106* (2019.05); *B64U 10/13* (2023.01); *B64U 2101/31* (2023.01); *G08B 15/00* (2013.01)

(58) Field of Classification Search
CPC .... G05D 1/106; G05D 1/0094; B64C 39/024; B64C 13/18; B64U 2101/00;
(Continued)

(56) References Cited

U.S. PATENT DOCUMENTS

2004/0245377 A1* 12/2004 Shiraishi .................. B64D 1/18
                                                                244/17.11
2014/0148978 A1*  5/2014 Duncan ................. A01M 29/18
                                                                119/713
(Continued)

FOREIGN PATENT DOCUMENTS

JP         2015-230621       12/2015
JP         2017-46270         3/2017
(Continued)

OTHER PUBLICATIONS

English Translation for WO-2019046598-A1 (Year: 2019).*
(Continued)

*Primary Examiner* — Faris S Almatrahi
*Assistant Examiner* — Moises Gasca Alva
(74) *Attorney, Agent, or Firm* — Wenderoth, Lind & Ponack, L.L.P.

(57) ABSTRACT

An unmanned aircraft includes: a sensor (person detection sensor) and so forth) that performs sensing of an external environment of the unmanned aircraft; a detector (suspicious person identifier) that detects a moving object based on a result of the sensing performed by the sensor; an obtainer (movement prohibition position determiner) that obtains area information indicating an area, entry to which by the moving object is undesirable; and a flight controller that causes the unmanned aircraft to move to a position between the moving object and the area indicated by the area information, based on a positional relation between the moving object and the area, and fly at the position that is a destination position.

15 Claims, 16 Drawing Sheets

(51) Int. Cl.
*B64U 101/31* (2023.01)
*G08B 15/00* (2006.01)

(58) Field of Classification Search
CPC ............... B64U 2201/10; G08B 7/066; G08B 13/19613; G08B 21/02; G08B 13/19608; G08B 13/1965; B64D 45/00
See application file for complete search history.

(56) References Cited

U.S. PATENT DOCUMENTS

| | | | |
|---|---|---|---|
| 2015/0339912 A1* | 11/2015 | Farrand | G08B 25/008 340/501 |
| 2015/0352719 A1 | 12/2015 | Nakazato et al. | |
| 2016/0266577 A1* | 9/2016 | Kerzner | G05D 1/104 |
| 2017/0115667 A1* | 4/2017 | Marr | G08G 5/0034 |
| 2017/0127652 A1* | 5/2017 | Shen | B64C 39/024 |
| 2017/0144756 A1* | 5/2017 | Rastgaar Aagaah | G05D 1/0094 |
| 2017/0205827 A1* | 7/2017 | Rezvani | G05D 1/02 |
| 2017/0287295 A1* | 10/2017 | Aswath | G08B 13/1965 |
| 2017/0330466 A1* | 11/2017 | Demetriades | G08G 5/0086 |
| 2018/0067502 A1* | 3/2018 | Chi-Hsueh | B64D 47/08 |
| 2018/0164080 A1* | 6/2018 | Chi-Hsueh | G05D 1/104 |
| 2018/0364662 A1* | 12/2018 | Meganathan | G05B 19/042 |
| 2019/0318596 A1* | 10/2019 | Pacella | B64C 39/024 |

FOREIGN PATENT DOCUMENTS

| | | | |
|---|---|---|---|
| JP | 3210413 | 5/2017 | |
| WO | WO-2019046598 A1 * | 3/2019 | ........... G05D 1/0094 |

OTHER PUBLICATIONS

Extended European Search Report issued Jan. 4, 2022 in corresponding European Patent Application No. 19886042.1.

International Search Report issued Oct. 8, 2019 in International (PCT) Application No. PCT/JP2019/034144.

Office Action with a Search Report issued Jun. 27, 2022 in counterpart Chinese Patent Application No. 201980006229.7, with English-language translation.

* cited by examiner

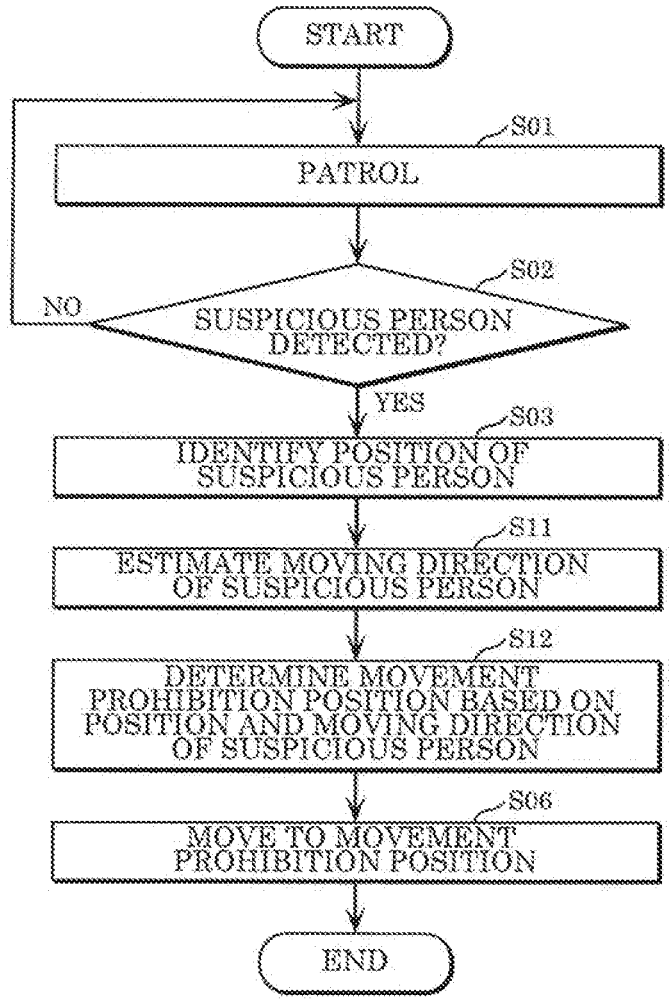

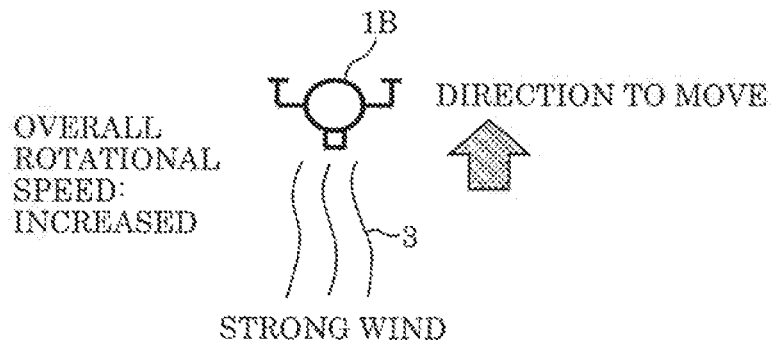
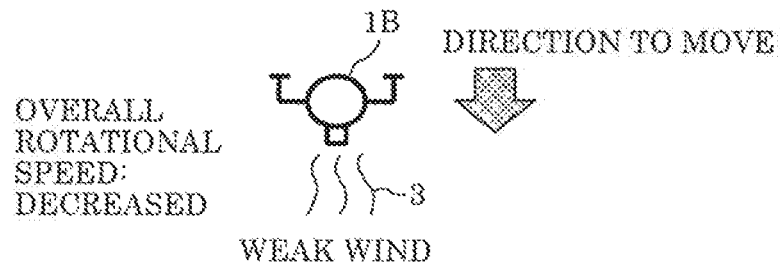
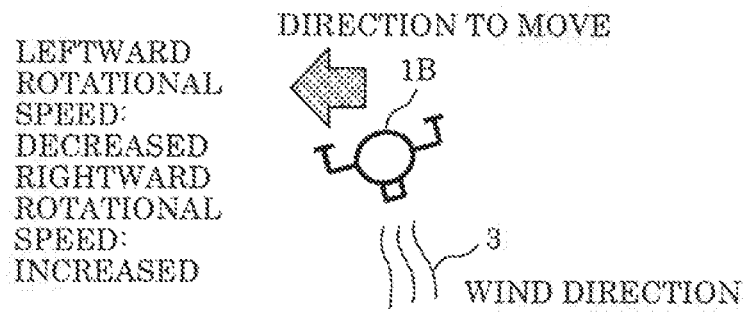
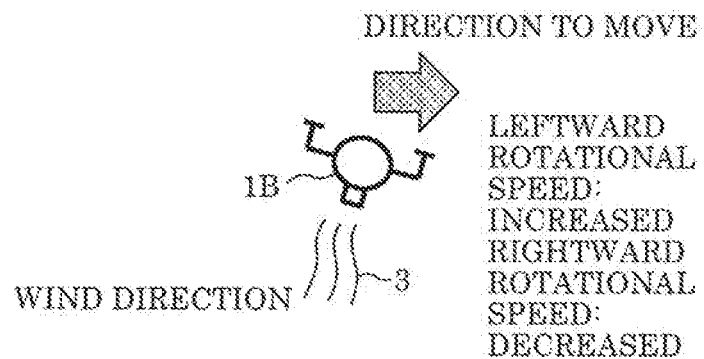

UNMANNED AIRCRAFT, CONTROL METHOD, AND RECORDING MEDIUM

CROSS REFERENCE TO RELATED APPLICATIONS

This application is a U.S. continuation application of PCT International Patent Application Number PCT/JP2019/034144 filed on Aug. 30, 2019, claiming the benefit of priority of Japanese Patent Application Number 2018-222052 filed on Nov. 28, 2018, the entire contents of which are hereby incorporated by reference.

BACKGROUND

1. Technical Field

The present disclosure relates to an unmanned aircraft, a control method for the same, and a recording medium.

2. Description of the Related Art

A security surveillance system has been disclosed that utilizes an unmanned aircraft such as a drone capable of intimidating and expelling a suspicious person for crime prevention in a house, a shop, a workplace, and a facility such as a factory (e.g., Japanese Utility Model Registration No. 3210413). Japanese Utility Model Registration No. 3210413 discloses that, upon detecting that a suspicious person has entered a surveillance area, an unmanned aircraft equipped with an alarming device that outputs, for example, an alarming sound or an alarming voice moves to the position of the suspicious person to intimidate the person by use of the alarming device.

SUMMARY

However, it is difficult in some cases for the above background art to prevent a moving object from entering a specific area. For example, the above background art can allow the suspicious person to enter the surveillance area when such person ignores the intimidation.

In view of this, the present disclosure provides an unmanned aircraft and so forth capable of preventing a moving object from moving to an area, entry to which by a moving object is undesirable.

An unmanned aircraft according to an aspect of the present disclosure is an unmanned aircraft, including: a sensor that performs sensing of an external environment of the unmanned aircraft; a detector that detects a moving object based on a result of the sensing performed by the sensor; an obtainer that obtains area information indicating an area, entry to which by the moving object is undesirable; and a flight controller that causes the unmanned aircraft to move to a position between the moving object and the area indicated by the area information, based on a positional relation between the moving object and the area, and fly at the position that is a destination position.

Note that these general or specific aspects may be implemented as a system, a device, a method, a recording medium, or a computer program, or may be implemented as a combination of a system, a device, a method, a recording medium, and a computer program.

The unmanned aircraft and so forth according to the present disclosure are capable of preventing a moving object from moving to an area, entry to which by a moving object is undesirable.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8A is a table showing an exemplary correspondence between the moving speed of the suspicious person and the distance at which the unmanned aircraft is to be away from the suspicious person;

FIG. 8B is a table showing an exemplary correspondence between the distance from the unmanned aircraft to the suspicious person; and the distance at which the unmanned aircraft is to be away from the suspicious person;

FIG. 9 is a flowchart showing the flow of processes performed by the unmanned aircraft according to Embodiment 2 of prohibiting the movement of the suspicious person;

FIG. 12A is a diagram showing exemplary characteristics of wind generated by the unmanned aircraft according to Embodiment 3 by performing a flight operation;

FIG. 12B is a diagram showing exemplary characteristics of wind generated by the unmanned aircraft according to Embodiment 3 by performing a flight operation;

FIG. 12C is a diagram showing exemplary characteristics of wind generated by the unmanned aircraft according to Embodiment 3 by performing a flight operation;

FIG. 12D is a diagram showing exemplary characteristics of wind generated by the unmanned aircraft according to Embodiment 3 by performing a flight operation;

DETAILED DESCRIPTION OF THE EMBODIMENTS

Background to the Present Disclosure

Figure 1A:
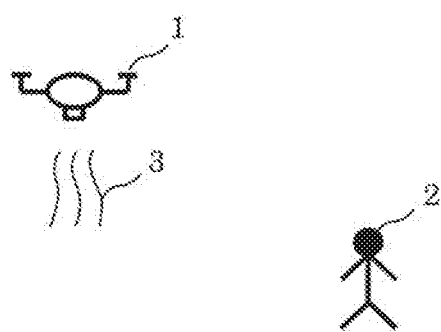
FIG. 1A is a conceptual diagram showing a situation in which an unmanned aircraft according to Embodiment 1 has identified a suspicious person.

The background art is capable of intimidating the moving object such as a suspicious person by use of the alarming device only to generate an alarm to the moving object, and thus fails to prevent the movement of the moving object. There is a problem that the moving object can freely move in the surveillance area. As such, it is easy for the moving object to enter an entry prohibited area such as an area where, for example, a safe box or other valuables are located and escape from the surveillance area. The unmanned aircraft according to the background art, which is equipped with the alarming device, has another problem that the device weight is increased accordingly. Furthermore, the background art does not consider its application other than to security usage.

An unmanned aircraft that rotates at least one propeller to fly the own aircraft is characteristic in that the rotation of the propeller generates wind in a vertically downward direction when performing a flight operation.

In view of the above, the unmanned aircraft according to an aspect of the present disclosure is an unmanned aircraft, including: a sensor that performs sensing of an external environment of the unmanned aircraft; a detector that detects a moving object based on a result of the sensing performed by the sensor; an obtainer that obtains area information indicating an area, entry to which by the moving object is undesirable; and a flight controller that causes the unmanned aircraft to move to a position between the moving object and the area indicated by the area information, based on a positional relation between the moving object and the area, and fly at the position that is a destination position.

With this aspect, the unmanned aircraft flies at the position between the moving object such as a suspicious person and an area, entry to which by the moving object is undesirable, such as a off-limits area (referred to also as entry prohibited area), thereby preventing the moving object from moving to the entry prohibited area by wind generated by its flight operation. Also, the unmanned aircraft prevents the movement of the moving object by use of a function the unmanned aircraft originally has for flying, and thus can prevent the movement of the moving object without an increase in the weight of the unmanned aircraft.

The destination position may be a position on a route from a position of the moving object to the area.

With this aspect, the unmanned aircraft flies in the air above the route which leads from the position of the moving object to the entry prohibited area and through which the moving object travels to generate wind. The unmanned aircraft can thus prevent the moving object from moving toward the entry prohibited area.

The destination position may be a position at which the route has a narrowest width.

With this aspect, the unmanned aircraft prohibits (referred to also as prevents) the movement of the moving object at a portion at which the route has a narrow width. This makes it difficult for the moving object to travel through such portion at which the route has a narrow width, while escaping the wind generated, and thus facilitates the prohibition of the movement of the moving object.

The flight controller may cause the unmanned aircraft to move to the destination position only when a position of the moving object is within a predetermined distance from the area.

When the positions at which the movement of the moving object will be prohibited change as a result of the moving object having moved, the distance for which the unmanned aircraft travels is greater as the distance from the moving object to the entry prohibited area is greater. As a result, the unmanned aircraft consumes a greater amount of battery. In contrast, the present aspect does not require the unmanned aircraft to move when the position of the moving object is not within the predetermined distance from the entry prohibited area. This enables the unmanned aircraft to travel a shorter distance, and thus reduces the battery consumption by the unmanned aircraft. Since the entry prohibited area has a high risk of being entered by the moving object when the position of the moving object is within the predetermined distance from the entry prohibited area, the present aspect effectively prevents the moving object from moving to the entry prohibited area.

When the area comprises a plurality of areas, the flight controller may cause the unmanned aircraft to move to the position between the moving object and a specific one of the plurality of areas that corresponds to a position of the moving object.

With this aspect, a specific entry prohibited area is determined from a plurality of entry prohibited areas depending on the position of the moving object, and thus the movement of the moving object to the specific entry prohibited area is prevented depending on the position of the moving object. For example, the present aspect prohibits the moving object from moving to an entry prohibited area having a higher security level than that of the entry prohibited area in which the moving object is currently present.

The flight controller may cause the unmanned aircraft to move to the position between the area and the moving object, based on the positional relation and a direction in which the moving object is to move.

With this aspect, the unmanned aircraft moves to the position between the moving object and the entry prohibited area on the basis of not only the positional relation but also the direction in which the moving object is to move. This thus prevents the moving object from moving to the entry prohibited area more effectively.

The flight controller may cause the moving object to move to the position between the area and the moving object only when the direction is toward the area.

With this aspect, the unmanned aircraft moves to the position between the entry prohibited area and the moving object to prevent the movement of the moving object, only when the direction in which the moving object is to move is a direction toward the entry prohibited area. This thus reduces battery consumption.

The flight controller may cause the moving object to move to the position between the area and the moving object only when the moving object has moved in the direction.

When performing a process of moving to the position at which the unmanned aircraft will prohibit the movement of the moving object despite that the moving object has not yet moved toward the entry prohibited area, the unmanned aircraft performs such process in vain if the moving object does not actually move toward the entry prohibited area. In contrast to this, the present aspect enables the unmanned aircraft to move to the position between the entry prohibited area and the moving object only when the moving object has moved toward the entry prohibited area, and thus prevents such process from being performed in vain.

The flight controller may further perform wind-blow control for controlling the unmanned aircraft to cause wind generated by flight of the unmanned aircraft to be blown to the moving object, when the moving object is approaching the unmanned aircraft.

With this aspect, the unmanned aircraft is controlled so that wind generated by its flight operation is blown to the moving object when the moving object is approaching the unmanned aircraft. This thus more strongly prohibits the movement of the moving object. When the unmanned aircraft is an aircraft such as a drone, for example, that generates wind in a vertically downward direction to fly, the movement of the moving object is more strongly prohibited by controlling the unmanned aircraft so that the aircraft body is tilted to directly subject the moving object to wind.

The flight controller may further adjust the wind-blow control, based on changes in a position of the moving object after performing the wind-blow control.

With this aspect, the determination is made on whether the moving object is approaching closer to the unmanned aircraft, whether the moving object is staying still, or whether the moving object has moved away from the unmanned aircraft, on the basis of the position of the moving object after being subjected to wind. This enables to adjust the way and so forth of subjecting the moving object to wind in accordance with such determination.

The flight controller may perform the wind-blow control when a position of the moving object is within a predetermined distance from the area.

With this aspect, wind is blown to the moving object when the position of the moving object is within the predetermined distance from the entry prohibited area. This thus enables the wind to be blown to the moving object when the moving object is present near the entry prohibited area, which thus has a high risk of being entered by the moving object.

The flight controller may continuously perform the wind-blow control while the position of the moving object is within the predetermined distance from the area.

With this aspect, wind is iteratively blown to the moving object while the position of the moving object is within the predetermined distance from the entry prohibited area. This thus strongly urges the moving object to move to a position that passes over the predetermined distance from the entry prohibited area.

The unmanned aircraft may further include: a presentation controller that causes a presentation device to perform presentation, at the destination position, for directing the moving object toward a different direction from a direction that leads from the moving object toward the area, and the presentation device may be included in the unmanned aircraft or located around the unmanned aircraft.

With this aspect, the unmanned aircraft not only moves to the position between the entry prohibited area and the moving object, but also performs presentation for directing the moving object to another position. This thus prevents the moving object from entering the entry prohibited area in a more reliable manner.

In order to solve the above problem, the control method according to the present disclosure is a control method of controlling an unmanned aircraft. Such control method includes: detecting a moving object based on a result of sensing performed by a sensor that performs sensing of an external environment of the unmanned aircraft; obtaining area information indicating an area, entry to which by the moving object is undesirable; and causing the unmanned aircraft to move to a position between the moving object and the area indicated by the area information, based on a positional relation between the moving object and the area, and fly at the position that is a destination position.

This aspect provides a control method that prevents the moving object from moving to an area, entry to which by the moving object is undesirable.

In order to solve the above problem, the recording medium according to the present disclosure is a non-transitory computer-readable recording medium having recorded thereon a program that causes a computer to execute the above control method.

This aspect provides a recording medium that prevents the moving object from moving to an area, entry to which by the moving object is undesirable.

The following describes the embodiments according to the present disclosure with reference to the drawings.

The following description assumes that a moving object detected by the unmanned aircraft is a suspicious person. However, such moving object is not limited to a suspicious person, i.e., a person, and thus may be an animal, a machine, and so forth.

Embodiment 1

With reference to the drawings, Embodiment 1 describes in detail an operation, performed by the unmanned aircraft when detecting a suspicious person during a patrol flight, of preventing the movement of the suspicious person, so that the suspicious person will not move to an area, entry to which by a suspicious person is undesirable.

Figure 1B:
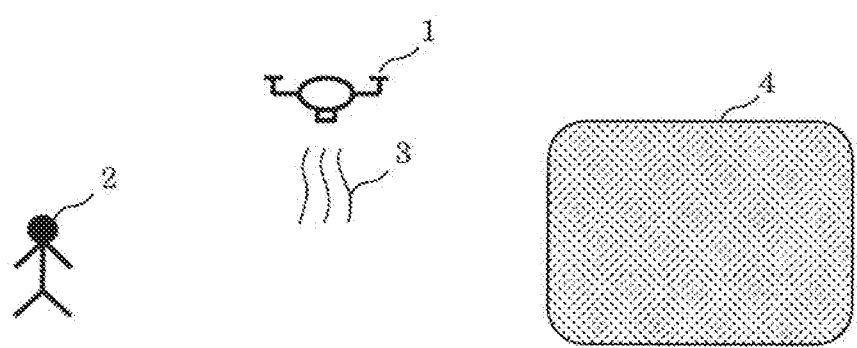
FIG. 1B is a conceptual diagram showing an image of an operation performed by the unmanned aircraft according to Embodiment 1 of moving to a position at which the unmanned aircraft will prohibit the movement of the suspicious person.

FIG. 1A is a conceptual diagram showing a situation in which unmanned aircraft 1 according to Embodiment 1 has identified suspicious person 2. FIG. 1A illustrates a situation in which unmanned aircraft 1 is performing a flight operation of levitating its aircraft body in the air and generating wind 3 by such flight. FIG. 1B is a conceptual diagram showing an image of an operation performed by unmanned aircraft 1 according to Embodiment 1 of moving to a position at which unmanned aircraft 1 will prohibit the movement of suspicious person 2. FIG. 1B illustrates a situation in which unmanned aircraft 1, after detecting suspicious person 2, moves to a position between suspicious person 2 and entry prohibited area 4 to prevent suspicious person 2 from moving to entry prohibited area 4, and performs a flight operation at such position to generate wind 3. Entry prohibited area 4 is an area which is desired to be prohibited from entry of suspicious person 2. Stated differently, such area is an area off-limits to suspicious person 2. In still other words, such area is an area, entry to which by suspicious person 2 is undesirable.

Unmanned aircraft 1 is an autonomous flight capable aircraft that generates wind 3 by performing a flight operation. Examples of unmanned aircraft 1 include a multicopter known as a drone having a plurality of propellers, and a singlecopter such as a radio control helicopter having a single propeller. Unmanned aircraft 1 rotates the propeller(s), when performing a flight operation, to generate wind 3 in a vertically downward direction.

When detecting suspicious person 2 during a patrol flight, unmanned aircraft 1 prevents the movement of suspicious person 2, as shown in FIG. 1B, so that suspicious person 2 will not move to entry prohibited area 4. For this reason, the present disclosure utilizes wind 3 generated by unmanned aircraft 1 not only for the flight of unmanned aircraft 1, but also for the prevention of the movement of suspicious person 2.

Figure 2:
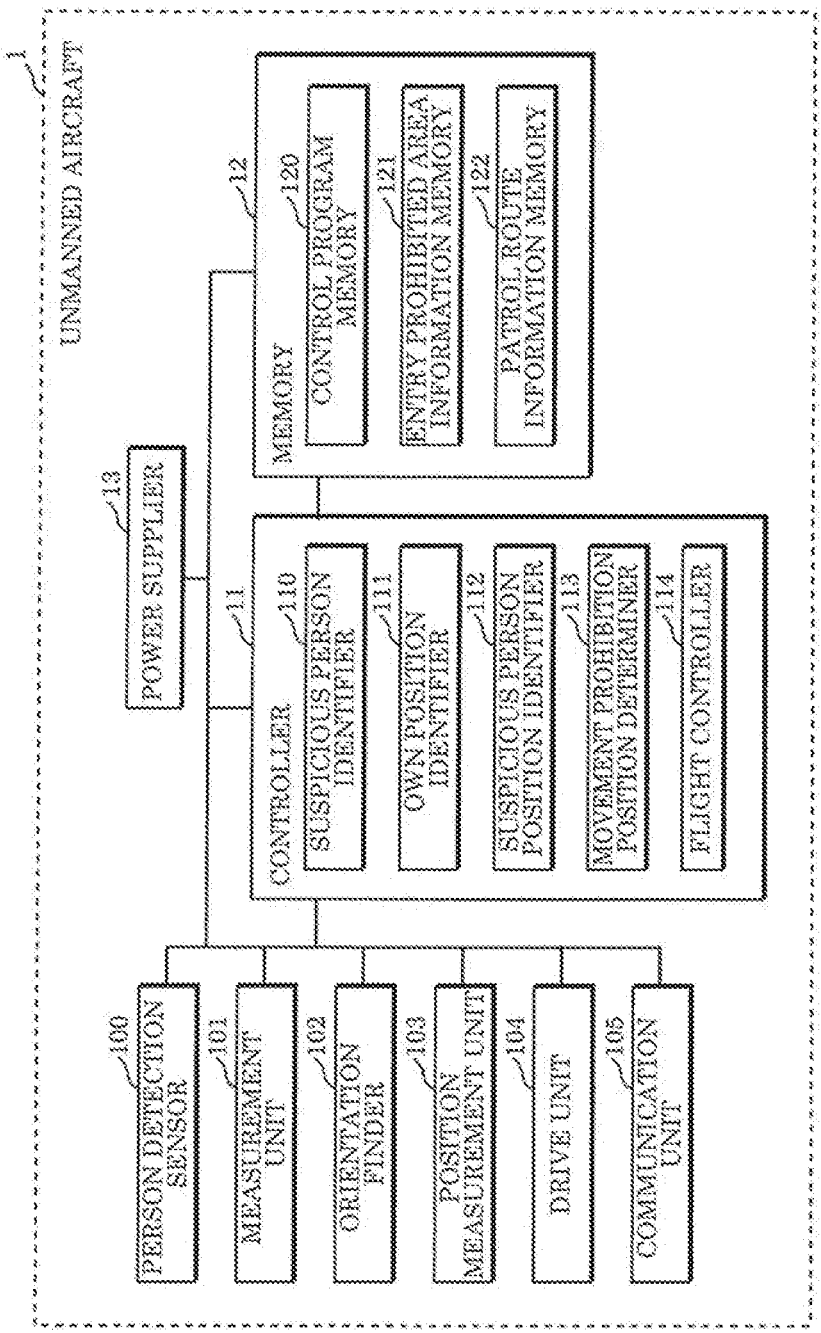
FIG. 2 is a block diagram showing the configuration of the unmanned aircraft according to Embodiment 1.

FIG. 2 is a block diagram showing the configuration of unmanned aircraft 1 according to Embodiment 1.

As shown in the diagram, unmanned aircraft 1 includes person detection sensor 100, distance measurement unit 101, orientation finder 102, position measurement unit 103, drive unit 104, communication unit 105, controller 11, memory 12, and power supplier 13.

Person detection sensor 100 is a sensor that detects a person around unmanned aircraft 1. Examples of person detection sensor 100 include a human-detecting sensor, such as an infrared sensor, and an imaging sensor (camera) that detects a person on the basis of photographed information. Person detection sensor 100 may also be, for example, an infrared camera, a night-vision camera, or another capable of taking images at night. Note that person detection sensor 100 may be another sensor that is capable of detecting persons. A microphone may be used as person detection sensor 100, for example, when person detection is performed on the basis of whether person's voice has been detected. The sensor that performs the sensing of an external environment of unmanned aircraft 1 is implemented, for example, by person detection sensor 100.

Distance measurement unit 101 is a sensor that measures the distance from a target object for measurement to unmanned aircraft 1. Examples of distance measurement unit 101 include an infrared sensor, an ultrasonic sensor, and a stereo camera. The sensor that performs the sensing of an external environment of unmanned aircraft 1 may also be implemented, for example, by distance measurement unit 101.

Orientation finder 102 is a geomagnetic sensor that measures the direction of a magnetic field to find the orientation.

Position measurement unit 103 is a sensor that measures the position of unmanned aircraft 1. An example of position measurement unit 103 is a global positioning system (GPS). For the possible case where unmanned aircraft 1 is at a position out of reach of a GPS signal, position measurement unit 103 may measure the position of unmanned aircraft 1 by use of Wi-Fi® or beacon. Position measurement unit 103 may be any sensor, etc. capable of measuring the position of unmanned aircraft 1.

Drive unit 104 includes, for example, a motor, propeller(s), and so forth. Drive unit 104 performs an operation of flying unmanned aircraft 1 by controlling the motor to cause the propeller(s) to rotate, on the basis of control by flight controller 114 to be described later. Note that drive unit 104 may be configured to use an engine instead of the motor. Such rotation of the propeller(s) generates wind 3 from unmanned aircraft 1.

Communication unit 105 is a communication interface via which information is exchanged between unmanned aircraft 1 and an external device. Communication unit 105 performs wireless communication using, for example, Wi-Fi, long term evolution (LTE), 5th Generation (5G), and so forth. Via communication unit 105, unmanned aircraft 1 receives a manipulation signal from a manipulation device (not illustrated) located outside of unmanned aircraft 1 and transmits photographed data obtained by unmanned aircraft 1 to a terminal of a surveillant in a remote location (not illustrated). Note that communication unit 105 may include a plurality of components to enable its use in different ways depending on usage and a device to be connected. For example, communication unit 105 may be configured to use Wi-Fi for communication with the manipulation device for reception of a manipulation signal and use a 5G line for transmission of photographed data to the surveillant in a remote location.

Controller 11 is a unit that performs various controls. Controller 11 is, for example, a central processing unit (CPU). Controller 11 includes suspicious person identifier 110, own position identifier 111, suspicious person position identifier 112, movement prohibition position determiner 113, and flight controller 114. These various functions of controller 11 are achieved, for example, by the CPU operating in accordance with control programs stored in control program memory 120 to be described later.

Suspicious person identifier 110 is an example of the detector that detects suspicious person 2 on the basis of the results of sensing performed by the sensors (person detection sensor 100, distance measurement unit 101, and so forth). Suspicious person identifier 110 performs a process of identifying suspicious person 2. Suspicious person identifier 110 according to Embodiment 1 identifies suspicious person 2 on the basis of information obtained by person detection sensor 100. For example, suspicious person identifier 110 may regard a person detected by person detection sensor 100 as suspicious person 2. In another example, when person detection sensor 100 is an imaging sensor, suspicious person identifier 110 may identify suspicious person 2 by performing a process of recognizing an image of a person detected by the imaging sensor and determining whether such person is suspicious person 2. This prevents a person who is not suspicious person 2 from being regarded as suspicious person 2.

Own position identifier 111 identifies the position of the own aircraft (unmanned aircraft 1) on the basis of information obtained from position measurement unit 103. Own position identifier 111 identifies the position of the own aircraft from, for example, GPS information obtained by position measurement unit 103. Note that another method that can identify the position of the own aircraft may be used to identify the position of the own aircraft, instead of the method that uses GPS information. Own position identifier 111 may use, for example, the technology of simultaneous localization and mapping (SLAM) to estimate the own position, and determine such estimated position as the position of the own aircraft. Alternatively, own position identifier 111 may use a wireless signal such as Wi-Fi and beacon to identify the position of the own aircraft.

Suspicious person position identifier 112 identifies the position of suspicious person 2 detected by suspicious person identifier 110. Suspicious person position identifier 112 according to Embodiment 1 calculates the relative position of suspicious person 2 with respect to unmanned aircraft 1 by use of the distance from unmanned aircraft 1 to suspicious person 2 measured by measurement unit 101 and the direction from unmanned aircraft 1 to suspicious person 2 obtained by orientation finder 102. Suspicious person position identifier 112 then identifies the position of suspicious person 2 on the basis of the position of unmanned aircraft 1 measured by position measurement unit 103 and the relative position of suspicious person 2. Note that the method of identifying the position of suspicious person 2 may be any method that can identify the position of suspicious person 2. For example, unmanned aircraft 1 may be configured to identify the position of suspicious person 2 by previously holding map information on a surveillance area such as an area in which unmanned aircraft 1 patrols and identifying which position in the map information suspicious person 2 is present. The absolute position of suspicious person 2 does not necessarily have to be identified, and thus at least the positional relation between unmanned aircraft 1 and suspicious person 2 (e.g., relative position of suspicious person 2 with respect to unmanned aircraft 1) is simply required to be identified.

Figure 3:
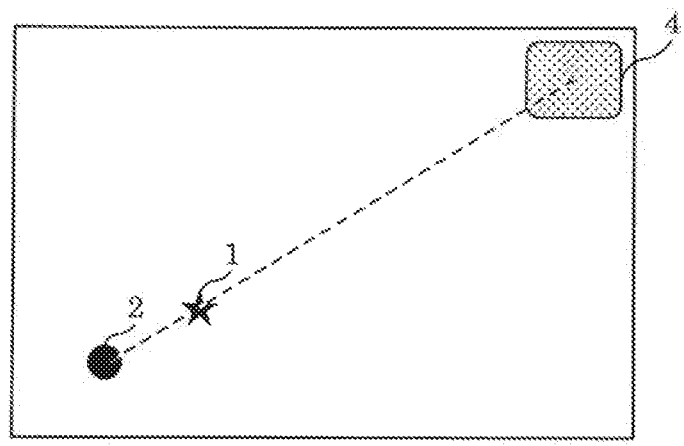
FIG. 3 is a bird's eye view showing an exemplary straight line route from the suspicious person to an entry prohibited area.

Movement prohibition position determiner 113 is an example of the obtainer that obtains area information indicating an area off-limits to suspicious person 2 (i.e., entry prohibited area 4). Movement prohibition position determiner 113 determines the flight position at which the entry of suspicious person 2 into the entry prohibited area will be prohibited (to be referred to also as prevented), by use of wind 3 generated by unmanned aircraft 1 performing a flight operation. For example, movement prohibition position determiner 113 determines the flight position at which the movement of suspicious person 2 will be prohibited, on the basis of the positional relation between suspicious person 2 and the area indicated by the area information. Movement prohibition position determiner 113 according to Embodiment 1 obtains the above-described area information (to be referred to also as entry prohibited area information) previously stored in entry prohibited area information memory 121, and determines the position at which the movement of suspicious person 2 is to be prohibited, on the basis of the entry prohibited area information and the position of suspicious person 2 identified by suspicious person position identifier 112. Here, the entry prohibited area information is information that relates to entry prohibited area 4, which is an area desired to be prohibited from entry of suspicious person 2, and that includes at least information indicating the position of entry prohibited area 4. The position of entry prohibited area 4 is, for example, a single representative point within entry prohibited area 4. Note that any point may be set as the representative point, and thus the central point of the area, for example, may serve as the representative point. Alternatively, the representative point may be an exit/entrance, etc. of entry prohibited area 4, and thus may be, for example, the position of a door or a window. The information on the position of entry prohibited area 4 is, for example, position information represented by map information such as a building, or GPS information. Unmanned aircraft 1 flies at a predetermined flight altitude at the position, determined by movement prohibition position determiner 113, at which unmanned aircraft 1 will prohibit the entry of suspicious person 2. Note that the predetermined flight altitude may be any flight altitude and may be determined by a supervisor, etc. Also, information on the flight altitude may be previously stored in memory 12. With reference to FIG. 3, the following describes the flight position, determined by movement prohibition position determiner 113, at which the entry of suspicious person 2 will be prohibited.

FIG. 3 is a bird's eye view showing an exemplary straight line route from suspicious person 2 to entry prohibited area 4. FIG. 3 shows such straight line route by a dashed line.

A flight position at which the movement of suspicious person 2 will be prohibited (i.e., destination position to which unmanned aircraft 1 is to move) is a position on the route from the position of suspicious person 2 to entry prohibited area 4. For example, the position at which the movement of suspicious person 2 will be prohibited can be a position that is on the straight line from the position of suspicious person 2 to the position of entry prohibited area 4 and that is spaced apart from the position of suspicious person 2 by a predetermined distance. In FIG. 3, the black circle represents the position of suspicious person 2, the doted area represents entry prohibited area 4, and the star mark represents the position to which unmanned aircraft 1 is to move. This enables unmanned aircraft 1 to fly in the air above the position between suspicious person 2 and entry prohibited area 4 to generate wind 3. Wind 3 generated by the flight operation of unmanned aircraft 1 is strong enough to make it difficult for a person to pass through the area below the wind. As such, by flying in the air above the position between suspicious person 2 and entry prohibited area 4 to generate wind 3, unmanned aircraft 1 prevents suspicious person 2 from moving toward entry prohibited area 4.

When the straight line route that passes from the position of suspicious person 2 through the position of entry prohibited area 4 is a route travelable by a person as shown in FIG. 3, the movement of suspicious person 2 to entry prohibited area 4 is preventable. When such straight line route is not a route travelable by a person, however, the movement of suspicious person 2 to entry prohibited area 4 may not be preventable in some cases. For this reason, movement prohibition position determiner 113 may determine a route that leads from the position of suspicious person 2 to entry prohibited area 4 and that is travelable by a person, and then determine a position that is on such route and that is spaced apart from the position of suspicious person 2 by the predetermined distance, as the position at which the movement of suspicious person 2 will be prohibited. This will be described below with reference to FIG. 4.

Figure 4:
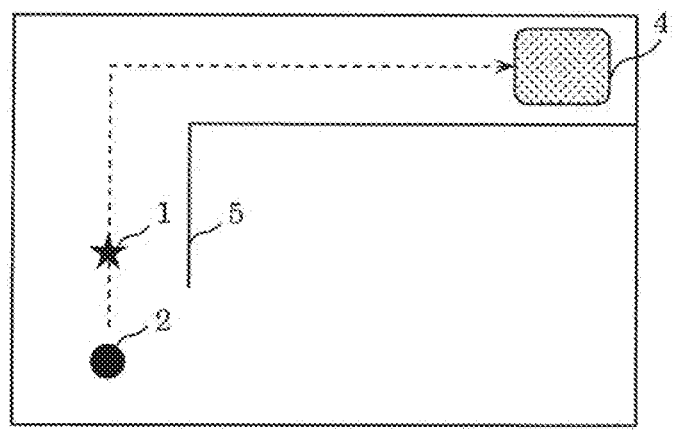
FIG. 4 is a bird's eye view showing an exemplary route from the suspicious person to an entry prohibited area.

FIG. 4 is a bird's eye view showing an exemplary route from suspicious person 2 to entry prohibited area 4. FIG. 4 shows such route by a dashed line. In FIG. 4, similar to FIG. 3, the black circle represents the position of suspicious person 2, the doted area represents entry prohibited area 4, and the star mark represents the destination position to which unmanned aircraft 1 is to move. The route that leads from the position of suspicious person 2 to entry prohibited area 4 and that is travelable by a person (e.g., route defined by wall 5) is determined, for example, on the basis of map information such as a building. A position that is on the route and that is spaced apart from the position of suspicious person 2 by the predetermined distance is then defined as the position to which unmanned aircraft 1 is to move. This enables unmanned aircraft 1 to fly in the air above the route from the position of suspicious person 2 to entry prohibited area 4 to generate wind 3, thereby preventing suspicious person 2 from moving to entry prohibited area 4. Note that when a plurality of routes that lead from the position of suspicious person 2 to entry prohibited area 4 and that are travelable by a person are present, unmanned aircraft 1 may select one of these routes. For example, unmanned aircraft 1 may select the shortest one of the routes. Alternatively, unmanned aircraft 1 may, for example, estimate and select a possible route that can be selected by suspicious person 2 from the direction in which suspicious person 2 is to move.

On the basis of the positional relation between suspicious person 2 and the area indicated by area information (entry prohibited area 4), flight controller 114 causes unmanned aircraft 1 to move to the position between entry prohibited area 4 and suspicious person 2 and fly at such destination position. Flight controller 114 controls the flight of unmanned aircraft 1 in accordance with: a flight program that is previously set; a flight control signal received from communication unit 105; control instructions from various components included in controller 11; and so forth. Flight controller 114 according to Embodiment 1 causes unmanned aircraft 1 to move to the position, determined by movement prohibition position determiner 113 included in controller 11, at which unmanned aircraft 1 will prohibit the movement of suspicious person 2, and controls the flight so that unmanned aircraft 1 flies at the predetermined flight altitude.

Memory 12 is intended for storing information. An example of memory 12 is a nonvolatile memory. Memory 12 includes control program memory 120, entry prohibited area information memory 121, and patrol route information memory 122.

Control program memory 120 stores control programs, according to which various components included in controller 11 operate. Various programs may be previously stored in memory 12, or may be obtained from an external device such as a server via communication unit 105 and stored. Such programs may also be updated.

Entry prohibited area information memory 121 stores information that relates to entry prohibited area 4, which is an area desired to be prohibited from entry of suspicious person 2, and that includes at least information indicating the position of entry prohibited area 4. The position of entry prohibited area 4 is, for example, a single representative point within entry prohibited area 4. Note that any point may be set as the representative point, and thus the central point of the area, for example, may serve as the representative point. The information indicating the position of entry prohibited area 4 is, for example, position information represented by map information such as a building, or GPS information. Entry prohibited area 4 is, for example, an area in which valuables, a safe box, and so forth are located.

Patrol route information memory 122 stores patrol route information indicating a route along which unmanned aircraft 1 performs a patrol flight. The patrol route information is, for example, information in which items of position information on the route are arranged in series. The patrol route information is previously stored in patrol route information memory 122 before unmanned aircraft 1 starts patrolling. Such information may be obtained from an external device via communication unit 105, or may be obtained via a recording medium, etc. Note that the patrol route information may be changed to another while unmanned aircraft 1 is moving along the route. When not being able to move forward along the patrol route due to an obstacle and so forth on the patrol route, for example, unmanned aircraft 1 may autonomously change the patrol route to another. Alternatively, unmanned aircraft 1 may obtain a changed route from a terminal of the supervisor, etc. in a remote location via communication unit 105 to change the patrol routes.

Power supplier 13, an example of which is a battery or a wired power supplier device, supplies power to the components in unmanned aircraft 1.

The following describes processing performed by unmanned aircraft 1 according to Embodiment 1 of the present disclosure of preventing the movement of suspicious person 2 so that suspicious person 2 will not move to entry prohibited area 4 that is desired to be prohibited from entry of suspicious person 2.

Figure 5:
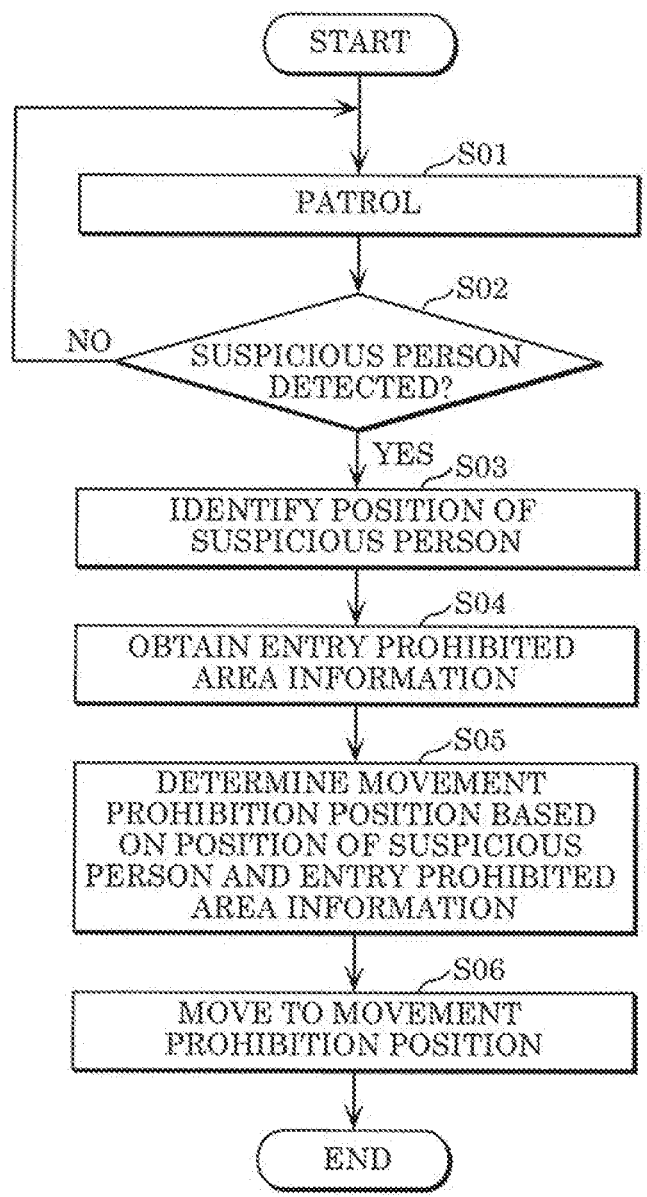
FIG. 5 is a flowchart showing the flow of processes performed by the unmanned aircraft according to Embodiment 1 of prohibiting the movement of the suspicious person.

FIG. 5 is a flowchart showing the flow of processes performed by unmanned aircraft 1 according to Embodiment 1 of prohibiting the movement of suspicious person 2. More specially, FIG. 5 is a flowchart showing the flow of processes performed by unmanned aircraft 1 according to Embodiment 1 of detecting suspicious person 2 during a patrol flight and preventing the movement of suspicious person 2 so that suspicious person 2 will not move to entry prohibited area 4 that is desired to be prohibited from entry.

The following describes the flowchart shown in FIG. 5.

Unmanned aircraft 1 starts a patrol flight in accordance with the patrol route information previously stored in patrol route information memory 122, and patrols along the patrol route indicated by the patrol route information (step S01). In Embodiment 1, flight that follows the patrol route information is achieved by position measurement unit 103 obtaining the position information on the own aircraft and flight controller 114 controlling the flight of unmanned aircraft 1 so that the position information on the own aircraft is along the route information. Also, to monitor whether any person is present within the surveillance target area during the flight, unmanned aircraft 1 performs sensing by use of person detection sensor 100 while flying.

When person detection sensor 100 has detected a person, suspicious person identifier 110 determines whether such detected person is suspicious person 2 (whether suspicious person 2 has been detected) (step S02). Any method may be used to determine whether the detected person is suspicious person 2. For example, suspicious person identifier 110 may determine that every person detected by person detection sensor 100 is suspicious person 2. Such detection method is effective when, for example, a place where no person is supposed to be present is monitored to detect suspicious person 2. Another detection method that may be used is that suspicious person identifier 110 performs a process of recognizing an image of a person shot by a camera serving as person detection sensor 100 and determining whether such person is suspicious person 2 to identify suspicious person 2. This prevents a person who is not suspicious person 2 from being regarded as suspicious person 2. When image recognition is performed to determine whether a person is suspicious person 2, for example, the face of suspicious person 2 or the face of a person who is not suspicious person 2 is previously registered to be compared with registered information. Note that suspicious person identifier 110 may determine whether a person is suspicious person 2 from not only the face of such person, but also the clothing and so forth of such person. Suspicious person identifier 110 may also determine whether a person is suspicious person 2 on the basis of whether the person who has been photographed performs a predetermined action.

When suspicious person identifier 110 has not detected suspicious person 2 (NO in step S02), the process returns to step S01, and unmanned aircraft 1 continues the patrol flight.

When suspicious person identifier 110 has detected suspicious person 2 (YES in step S02), suspicious person position identifier 112 identifies the position of such suspicious person (step S03). More specifically, own position identifier 111 first identifies the position of the own aircraft on the basis of the information obtained from position measurement unit 103. For example, own position identifier 111 identifies the position of the own aircraft on the basis of the GPS information obtained by position measurement unit 103. Note that another method that can identify the position of the own aircraft may be used to identify the position of the own aircraft. For example, own position identifier 111 may use the SLAM technology to estimate the own position and use such estimated position as the position of the own aircraft. Alternatively, instead of GPS information, own position identifier 111 may use Wi-Fi, beacon, or another wireless signal to identify the position of the own aircraft. Suspicious person position identifier 112 calculates the relative position of suspicious person 2 with respect to unmanned aircraft 1 by use of the distance from unmanned aircraft 1 to suspicious person 2 measured by measurement unit 101 and the direction from unmanned aircraft 1 to suspicious person 2 obtained by orientation finder 102. Suspicious person position identifier 112 then identifies the position of suspicious person 2 on the basis of the position of the own aircraft measured by own position identifier 111 and the relative position of suspicious person 2. Note that any method that can identify the position of suspicious person 2 may be used to identify the position of suspicious person 2. For example, unmanned aircraft 1 may identify the position of suspicious person 2 by previously holding map information on a surveillance area such as an area in which unmanned aircraft 1 patrols and identifying which position in the map information suspicious person 2 is present.

After the position of suspicious person 2 is identified, movement prohibition position determiner 113 first obtains the entry prohibited area information stored in entry prohibited area information memory 121 to determine the flight position at which the movement of suspicious person 2 will be prohibited (step S04). The entry prohibited area information is information that is related to entry prohibited area 4, which is an area desired to be prohibited from entry of suspicious person 2, and that includes information indicating at least the position of entry prohibited area 4. The position of entry prohibited area 4 is, for example, a single representative point within entry prohibited area 4. Note that any point may be set as the representative point, and thus the central point of the area, for example, may serve as the representative point. The information indicating the position of entry prohibited area 4 is, for example, position information represented by map information such as a building, or GPS information.

Subsequently, movement prohibition position determiner 113 determines the position at which the movement of suspicious person 2 is desired to be prohibited, on the basis of the position of suspicious person 2 identified in step S03 and the entry prohibited area information obtained in step S04 (step S05). For example, movement prohibition position determiner 113 determines a route from the position of suspicious person 2 to entry prohibited area 4, and then determines a position that is on the route and that is spaced apart from the position of suspicious person 2 by the predetermined distance as the position at which the movement of suspicious person 2 will be prohibited.

Flight controller 114 causes unmanned aircraft 1 to move to the position, determined by movement prohibition position determiner 113, at which unmanned aircraft 1 will prohibit the movement of suspicious person 2, and controls the flight so that unmanned aircraft 1 flies at the predetermined flight altitude at such position. An existing route generation algorithm may be used to generate a flight route from the position of the own aircraft to the position at which the movement of suspicious person 2 will be prohibited. Also, flight control may be performed to cause unmanned aircraft 1 to move to the position at which unmanned aircraft 1 will prohibit the movement of suspicious person 2 and then fly at the predetermined flight altitude, or may be performed to cause unmanned aircraft 1 to move to the predetermined flight altitude, and then move to the position at which unmanned aircraft 1 will prohibit the movement of suspicious person 2.

Through the above processes, unmanned aircraft 1 moves to the air above the route leading from the position of suspicious person 2 to entry prohibited area 4 and subjects the route to wind 3 generated by its flight operation. This thus prevents suspicious person 2 from moving to entry prohibited area 4.

Embodiment 1 defines, as the position at which the movement of suspicious person 2 will be prohibited, a position between entry prohibited area 4 and suspicious person 2 that is on the straight line or the route from the position of suspicious person 2 to entry prohibited area 4 and that is spaced apart from the position of suspicious person 2 by the predetermined distance. Note, however, that the position at which the movement of suspicious person 2 will be prohibited may be any position on such straight line or route. For example, a position serving as the central point on such straight line (more specifically, line segment that connects the position of suspicious person 2 and a point within entry prohibited area 4) or on such route may serve as the position at which the movement of suspicious person 2 will be prohibited. Another example is that a position that is spaced apart from entry prohibited area 4 by a predetermined distance may serve as the position at which the movement of suspicious person 2 will be prohibited. For example, unmanned aircraft 1 may move close to entry prohibited area 4 to prohibit suspicious person 2 from entering entry prohibited area 4. When the positions at which the movement of suspicious person 2 will be prohibited change with the movement of suspicious person 2, unmanned aircraft 1 needs to travel a greater distance as the distance from entry prohibited area 4 to such position is greater. As a result, unmanned aircraft consumes a larger amount of battery. However, by waiting at around entry prohibited area 4 to prohibit the entry of suspicious person 2 who is approaching entry prohibited area 4, unmanned aircraft 1 travels a shorter distance, consuming a smaller amount of battery.

In another example, the destination position to which unmanned aircraft 1 is to move may be a position at which the straight line or the route has the narrowest width. The position at which the route has the narrowest width may be, for example, a door portion. When the straight line or the route extends over a plurality of rooms via the door, the position in front or back of the door may serve as the position at which the movement of suspicious person 2 will be prohibited. Note that the destination position to which unmanned aircraft 1 is to move may not exactly be the above-described position with the narrowest width, and thus may be around such position. This will be described below with reference to FIG. 6.

Figure 6:
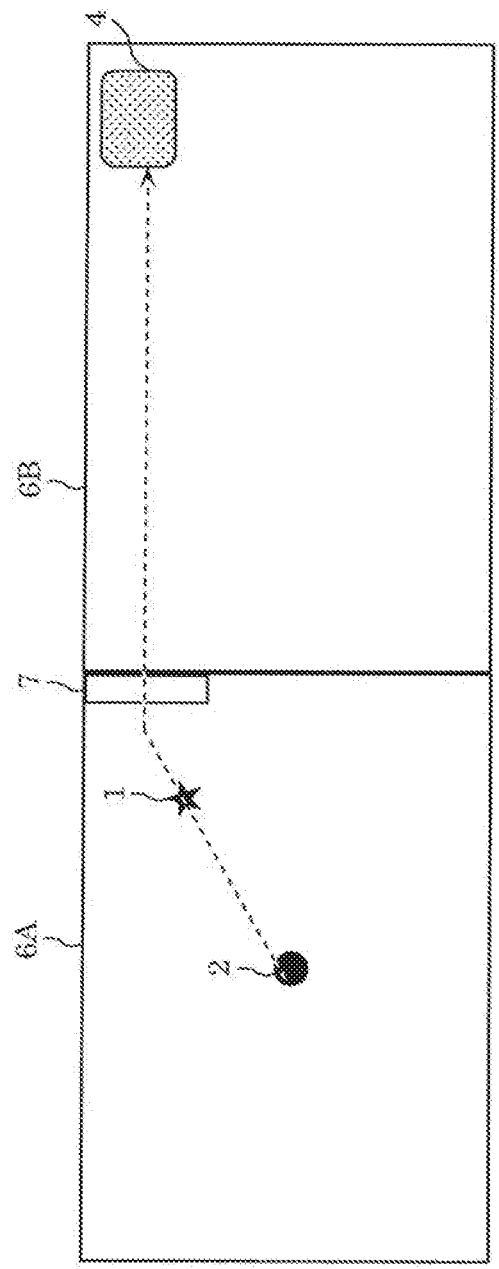
FIG. 6 is a bird' eye view showing another exemplary route from the suspicious person to an entry prohibited area.

FIG. 6 is a bird' eye view showing another exemplary route from suspicious person 2 to entry prohibited area 4. In FIG. 6, the dashed line represents the route from the position of suspicious person 2 to entry prohibited area 4. The star mark represents, as the position at which the movement of suspicious person 2 will be prohibited, a position that is located to the side of suspicious person 2 with respect to door 7 between room 6A and room GB on the route and that is spaced apart from entry prohibited area 4 by the predetermined distance. This facilitates the prohibition of the movement of suspicious person 2 because the movement of suspicious person 2 is prohibited at a portion at which the route has a narrow width. The description here uses the position with a door as the position at which the route has a narrow width, but a position other than the door may be used. For example, the place at which the route has a narrow width may be a place where many goods are located and thus with a narrow flow passage, or may be a corridor, stairs, and so forth. Information on the places at which the route has a narrow width may be previously stored in memory 12. The description here has explained the case where a single door is present, but the present disclosure is also applicable to the case where a plurality of doors are present on the route. In this case, for example, one of the doors may be selected according to a predetermined rule. The predetermined rule may be, for example, a rule that stipulates that the door of the room where suspicious person 2 is present should be selected. This enables unmanned aircraft 1 to prevent suspicious person 2 from approaching entry prohibited area 4 to a maximum extent. Another exemplary predetermined rule that may be used is a rule that stipulates that the door closest to unmanned aircraft 1 should be selected. This enables unmanned aircraft 1 to travel the shortest distance to the position at which unmanned aircraft 1 will prohibit the movement of suspicious person 2. Still another exemplary predetermined rule is a rule that stipulates that the door at which the route has the narrowest width should be selected. This enables unmanned aircraft 1 to easily prohibit the movement of suspicious person 2.

Note that when unmanned aircraft 1 moves to the air above the route leading from the position of suspicious person 2 to entry prohibited area 4 to subject the route to wind 3 generated by the flight operation of unmanned aircraft 1, unmanned aircraft 1 may move back and forth between the route in the width direction so that the entire width of the route is subjected to wind 3. This prevents suspicious person 2 from passing through a portion on the route that escapes from wind 3 even when the width of the route is greater than the range that is subjected to wind 3 generated by the flight operation of unmanned aircraft 1. Note that when the distance between the position of suspicious person 2 and unmanned aircraft 1 is small, the movement of unmanned aircraft 1 of moving back and forth between the width direction of the route can allow suspicious person 2 to pass through the other side of the route than the side to which unmanned aircraft 1 has moved in the width direction. For this reason, for example, unmanned aircraft 1 may stop moving back and forth between the route in the width direction or may move back and forth in a smaller distance between the route in the width direction. When the distance between the position of suspicious person 2 and unmanned aircraft 1 is small, unmanned aircraft 1 may perform a flight operation in a manner in which unmanned aircraft 1 flies in face of suspicious person 2 depending on the position of suspicious person 2. Also, unmanned aircraft 1 may randomly change the widths of the route between which unmanned aircraft 1 moves back and forth in the width direction so that suspicious person 2 cannot estimate the movement operation of unmanned aircraft 1.

Note that the flight position at which the movement of suspicious person 2 will be prohibited may be a position that takes into account also of a flight altitude.

For example, when unmanned aircraft 1 cannot move to the predetermined flight altitude because of a low ceiling over the flight position at which unmanned aircraft 1 will prohibit the movement of suspicious person 2, the flight position may be changed to another on the basis of a predetermined rule. For example, when determining, as the position at which unmanned aircraft 1 will prohibit the movement of suspicious person 2, a position that is on the route from the position of suspicious person 2 to entry prohibited area 4 and that is spaced apart from the position of suspicious person 2 by the predetermined distance and when failing to move to the predetermined flight altitude at such position at which unmanned aircraft 1 will prohibit the movement of suspicious person 2, unmanned aircraft 1 may move along the route from the position of suspicious person 2 to entry prohibited area 4 to search for a position at which unmanned aircraft 1 can move to the predetermined flight altitude. This enables unmanned aircraft 1 to move to the predetermined flight altitude at one of the positions on the route from the position of suspicious person 2 to entry prohibited area 4, and thus to prohibit the movement of suspicious person 2. Note that unmanned aircraft 1 may previously store in memory 12 areas in which unmanned aircraft 1 cannot move to the predetermined flight altitude and determine a position that is not included in such areas as the position at which unmanned aircraft 1 will prohibit the movement of suspicious person 2.

Alternatively, a certain extent of leeway may be previously given to the predetermined flight altitude so that unmanned aircraft 1 can adjust the flight altitude within such leeway when failing to move to the predetermined flight altitude. For example, the predetermined flight altitude is set at 2.5 meters and a leeway at 0.5 meters. When failing to move to the predetermined flight altitude, unmanned aircraft 1 may adjust the position within a flight altitude range between 2 meters and 2.5 meters in which unmanned aircraft 1 can move.

The description of Embodiment 1 assumes the case where suspicious person 2 is staying still. Assuming the case where suspicious person 2 will move, however, unmanned aircraft 1 may regularly identify the position of suspicious person 2 to correct the position at which unmanned aircraft 1 will prohibit suspicious person 2 from entering entry prohibited area 4, on the basis of the position of suspicious person 2 and the entry prohibited area information, and may fly at such corrected position in accordance with the flight control.

Also note that Embodiment 1 has described the case where a single item of entry prohibited area information is present, but plural items of entry prohibited area information may be present.

When plural items of entry prohibited area information are present, entry prohibition level information indicating a level at which the entry of suspicious person 2 is unallowable may be previously set for each area, for example, so that unmanned aircraft 1 determines which area to prohibit the entry of suspicious person, 2 on the basis of the entry prohibition level information. For example, unmanned aircraft 1 may extract an area with a higher entry prohibition level than that of the area in which suspicious person 2 is present, and determine for such extracted area the position at which unmanned aircraft 1 will prohibit the entry of suspicious person 2. This prohibits suspicious person 2 from entering an area with a higher entry prohibition level than that of the area in which suspicious person 2 is currently present.

Here, when a plurality of entry prohibited areas 4 with a high entry prohibition level are present, flight controller 114 may cause unmanned aircraft 1 to move to a position between suspicious person 2 and a specific area, among a plurality of entry prohibited areas 4, that corresponds to the position of suspicious person 2. For example, unmanned aircraft 1 may select one entry prohibited area 4 that is closest to the position of suspicious person 2 and determine for such area the position at which unmanned aircraft 1 will prohibit the entry of suspicious person 2. This preferentially prohibits suspicious person 2 from entering the area which is closest to suspicious person 2 and which thus has a high risk of being entered by suspicious person 2. Furthermore, when entry prohibited area 4 is the closest to suspicious person 2 and the position of suspicious person 2 is within a predetermined distance from such area, unmanned aircraft 1 may determine for such area the position at which unmanned aircraft 1 will prohibit the entry of suspicious person 2. This reduces battery consumption because unmanned aircraft 1 moves to the position at which unmanned aircraft 1 will prohibit the entry of suspicious person 2 only when the position of suspicious person 2 is within the predetermined distance from entry prohibited area 4 that is closest to suspicious person 2, i.e., only when a risk of being entered by suspicious person 2 has increased.

When a plurality of entry prohibited areas 4 with a high entry prohibition level are present, unmanned aircraft 1 may narrow down to some areas (e.g., narrow down to areas with the highest entry prohibition level) to determine the position at which unmanned aircraft 1 will prohibit the entry of suspicious person 2. Suspicious person 2 is required to take time, for example, to move to a distant area from the area in which suspicious person 2 is present. Stated differently, it takes time for a security guard, etc. to arrive at such area. For this reason, unmanned aircraft 1 may narrow down to the area that is closest from suspicious person 2 to determine the position at which unmanned aircraft 1 will prohibit the entry of suspicious person 2. This is because, unmanned aircraft 1 can cover only a limited range by itself, and thus consumes an increasingly large amount of battery when trying to operate to cover all of plural entry prohibited areas 4. As a result, unmanned aircraft 1 may end up failing to prohibit the entry to all the areas because of battery exhaustion.

When plural items of entry prohibited area information are present, unmanned aircraft 1 may determine the position at which unmanned aircraft 1 will prohibit the entry of suspicious person 2 for an area not having been entered by suspicious person 2, for example, on the basis of movement history of suspicious person 2. Information on the movement history of suspicious person 2 is obtained, for example, by a human-detecting sensor and a surveillance camera that are previously installed on the wall or the floor in the target area, from which unmanned aircraft 1 obtains information sensed by these devices. Unmanned aircraft 1 may receive the information obtained by sensing, directly from these devices via communication unit 105 or via an external device such as a server. This prohibits suspicious person 2 from entering an area not having been entered by suspicious person 2.

Note that unmanned aircraft 1 may determine the area that is desired to be prohibited from entry of suspicious person 2, on the basis of not only the movement history of suspicious person 2 but also information on an open-close sensor installed in a safe box and so forth in a target area, and determine for such area the position at which unmanned aircraft 1 will prohibit the entry of suspicious person 2. For example, when determining that a safe box in the area which is desired to be prohibited from entry of suspicious person 2 has not yet been opened, unmanned aircraft 1 may determine for such area the position at which unmanned aircraft 1 will prohibit the entry of suspicious person 2. This prohibits suspicious person 2 from entering the target area on the basis of information on whether the safe box has been opened. Note that whether the safe box has been opened may be estimated not only from information on the open-close sensor of the safe box, but also from the time during which suspicious person 2 has stayed in the target area where the safe box is located. The use of information on the open/close of the safe box to detect whether valuables have been taken out by suspicious person 2 is a mere example and thus the present discourse is not limited to this method. Recognition of camera image, for example, may thus be utilized to detect whether valuables have been taken out by suspicious person 2.

Note that unmanned aircraft 1 according to Embodiment 1 determines and moves to the position at which unmanned aircraft 1 will prohibit the entry of suspicious person 2 immediately after identifying suspicious person 2, but unmanned aircraft 1 may determine and move to the position at which unmanned aircraft 1 will prohibit the entry of suspicious person 2 at a different timing. For example, after identifying suspicious person 2, unmanned aircraft 1 may first perform a process of photographing suspicious person 2 to record an evidence of suspicious person 2, and then determine and move to the position at which unmanned aircraft 1 will prohibit the entry of suspicious person 2. This achieves both the recording of an evidence of suspicious person 2 and the prohibition of the entry of suspicious person 2. The process of photographing suspicious person 2 may be a process of photographing suspicious person 2 during a predetermined period, or may be a process of photographing suspicious person 2 until a part of suspicious person 2, such as the face, is detected as having been photographed.

Also, flight controller 114 may cause unmanned aircraft 1 to move to the destination position (position at which unmanned aircraft 1 will prohibit the entry of suspicious person 2) only when the position of suspicious person 2 is within the predetermined distance from entry prohibited area 4. More specifically, unmanned aircraft 1 may determine and move to the position at which unmanned aircraft 1 will prohibit the entry of suspicious person 2 when determining that suspicious person 2 has approached an area indicated by the entry prohibited area information. This reduces battery consumption because unmanned aircraft 1 does not perform a process of determining and moving to the position at which unmanned aircraft 1 will prohibit the entry of suspicious person 2 when the position of suspicious person 2 is distant from the area indicated by the entry prohibited area information and such area thus has a small risk of being entered by suspicious person 2. It is effective for unmanned aircraft 1 to perform such process especially when the remaining amount of battery of unmanned aircraft 1 is small. Unmanned aircraft 1 may thus be configured to perform such process depending on the remaining amount of battery. Unmanned aircraft 1 may also be configured to change distances, based on which suspicious person 2 is regarded as having approached entry prohibited area 4, depending on the remaining amount of battery of unmanned aircraft 1. For example, when a large amount of battery remains, unmanned aircraft 1 may regard suspicious person 2 as having approached entry prohibited area 4 when the distance between suspicious person 2 and entry prohibited area 4 is 10 meters or less. Meanwhile, when a small amount of battery remains, unmanned aircraft 1 may regard suspicious person 2 as having approached entry prohibited area 4 when the distance between suspicious person 2 and entry prohibited area 4 is 5 meters or less.

Note that unmanned aircraft 1 may determine whether to apply the present disclosure to prohibit the entry of suspicious person 2 to entry prohibited area 4 until when a security guard arrives at the site, on the basis of the time taken by the security guard to arrive at the site and the remaining amount of battery. For example, unmanned aircraft 1 may determine to apply the present disclosure when a small amount of battery remains and the security guard is arriving at the site 10 minutes after, and determine not to apply the present disclosure when a small amount of battery remains but the security guard is arriving at the site a minute after. Note that time taken by the security guard to arrive at the site may be a predetermined time from when suspicious person 2 has been detected as entering the building, or may be travel time required to arrive at the site calculated from: the distance between the site and that position of a mobile terminal carried by the security guard which is obtained by unmanned aircraft 1; and the movement speed of the security guard.

Embodiment 1 has described the case where the entry of suspicious person 2 to entry prohibited area 4 is prohibited, but the present disclosure is similarly applicable also to the case where suspicious person 2 is prohibited from escaping from the building to which suspicious person 2 has entered. In this case, when entry prohibited area 4 is outside of the building, prohibiting suspicious person 2 from entering entry prohibited area 4 (outside of the building) means prohibiting suspicious person 2 from escaping from such building. By prohibiting suspicious person 2 from escaping from the building to which suspicious person 2 has entered, a security guard or a police officer who has arrived at the site can overpower suspicious person 2. To prohibit suspicious person 2 from escaping from the building to which suspicious person 2 has entered, entry prohibited area 4 is defined as an exit/entrance or the outside of a window of the building from which suspicious person 2 is able to go out, and unmanned aircraft 1 prohibits suspicious person 2 from entering (i.e., moving to) such entry prohibited area 4. Note that the position of an exit/entrance or a window of the building is previously stored, for example, in memory 12. When the security guard or the police officer has arrived at the building, unmanned aircraft 1 may change not to prohibit suspicious person 2 from moving to an exit/entrance from which the security guard or the police officer will enter the building.

For the case where suspicious person 2 has entered the building, a user may previously set whether unmanned aircraft 1 performs an operation of prohibiting suspicious person 2 from entering entry prohibited area 4 that is located inside the building or prohibiting suspicious person 2 from escaping from the building to which suspicious person 2 has entered (stated differently, prohibits suspicious person 2 from entering entry prohibited area 4 located outside of the building).

Also, unmanned aircraft 1 may dynamically change, on the basis of a predetermined rule, whether to prohibit suspicious person 2 from entering entry prohibited area 4 or to prohibit suspicious person 2 from escaping from the area to which suspicious person 2 has entered. The predetermined rule, for example, is a rule previously set by the user. An exemplary predetermined rule that may be used, for example, is a rule that stipulates that suspicious person 2 should be prohibited from entering entry prohibited area 4 until a predetermined period has elapsed after suspicious person 2 has been detected as having entered the building and that suspicious person 2 should be prohibited from escaping from the building to which such suspicious person 2 has entered after such predetermined period. It takes time for a security guard or a police officer to arrive at the site after suspicious person 2 has been detected as having entered the building. An attempt to prohibit suspicious person 2 from escaping from the building to which such suspicious person 2 has entered in the absence of a security guard or a police officer at the site thus ends up with failure to overpower suspicious person 2. The present disclosure contributes to overpowering of suspicious person 2, because unmanned aircraft 1 regards the security guard or the police officer as approaching the site when the predetermined period has elapsed after suspicious person 2 has been detected as having entered the building and tries to prohibit suspicious person 2 from escaping from the building to which suspicious person 2 has entered. Note that the security guard or the police officer is regarded as approaching the site when the predetermined period has elapsed after suspicious person 2 has been detected as having entered the building, but the present disclosure is not limited to this. For example, unmanned aircraft 1 may obtain the position of a mobile terminal carried by the security guard or the police officer and regard that the security guard or the police officer is present close to the site when detecting that the security guard or the police officer is approaching unmanned aircraft 1.

Another exemplary predetermined rule may be a rule that stipulates, according to the movement history of suspicious person 2, that suspicious person 2 should be prohibited from entering entry prohibited area 4 when suspicious person 2 has not yet entered entry prohibited area 4 and that suspicious person 2 should be prohibited from escaping from the building to which suspicious person 2 has entered when suspicious person 2 has already entered entry prohibited area 4. More specifically, unmanned aircraft 1 determines whether suspicious person 2 has stolen valuables and so forth, on the basis of whether suspicious person 2 has entered entry prohibited area 4, and determines, on the basis of the determination result, whether to prohibit suspicious person 2 from entering entry prohibited area 4 or to prohibit suspicious person 2 from escaping from the building to which suspicious person 2 has entered. This prevents suspicious person 2 from easily escaping from the building, while unmanned aircraft 1 is performing an operation of prohibiting suspicious person 2 from entering entry prohibited area 4, although in fact suspicious person 2 is escaping after stealing valuables and so forth. Note that whether suspicious person 2 has stolen valuables and so forth is determined on the basis of the movement history of suspicious person 2, but the present disclosure is not limited to this. For example, whether suspicious person 2 has stolen valuables and so forth may be determined on the basis of the open-close history of a safe box in which the valuable are stored. In this case, unmanned aircraft 1 obtains information on the open-close sensor of the safe box. Unmanned aircraft 1 may also determine whether the safe box has been opened/closed on the basis of the time during which suspicious person 2 has stayed around the safe box. This enables the determination on whether the safe box has been opened/closed, using only the movement history of suspicious person 2 without using the open/close sensor.

Note that Embodiment 1 has described the case where entry prohibited area 4 is previously determined, but the present disclosure is applicable to the case where entry prohibited area 4 is different depending on situations. For example, unmanned aircraft 1 first identifies entry prohibited area 4, and determines for such identified entry prohibited area 4 the position at which unmanned aircraft 1 will prohibit suspicious person 2 from entering entry prohibited area 4. The case where entry prohibited area 4 is different depending on situations refers to the case, for example, where the building which suspicious person 2 has entered is a house, and the room in which a resident of the house is staying is defined as entry prohibited area 4. To prevent suspicious person 2 from harming the resident, entry prohibited area 4 at which the entry of suspicious person 2 will be prohibited differs depending on which room the resident is staying. A possible method of identifying the room in the house in which the resident is staying is, for example, that unmanned aircraft 1 obtains information from a human-detecting sensor previously installed in each room of the house to estimate the room in which the resident is staying. Note that the room in which the resident is staying may be estimated according to the status of a home appliance or a lighting fixture installed in a room, instead of using a human-detecting sensor. Also, unmanned aircraft 1 may obtain information on the human-detecting sensor, etc. via, for example, a server. A server may identify the room in which the resident is staying on the basis of the obtained information from the human-detecting sensor, etc. In this case, unmanned aircraft 1 may obtain information indicating the room in which the resident is staying from the server. Note that unmanned aircraft 1 may notify the resident of information relating to the area or the direction in which unmanned aircraft 1 will prohibit the entry of suspicious person 2. This enables the resident to refrain from moving to an area where unmanned aircraft 1 is not prohibiting the entry of suspicious person 2. The notification to the resident is made, for example, via the server, or directly to a mobile terminal carried by the resident or a device located in the room in which the resident is staying. Considering the possible case where the resident will move to another room, the position at which the resident is staying may be regularly checked to reconsider entry prohibited area 4.

Note that Embodiment 1 has described an example in which unmanned aircraft 1 by itself identifies suspicious person 2, but a person specified by the supervisor, etc. may be identified as suspicious person 2. For example, unmanned aircraft 1 may transmit video shot by a camera installed on the own aircraft to a terminal of the distant user via communication unit 105. The user then checks the video and specifies a person included in the video, thereby identifying the specified person as suspicious person 2. In this case, unmanned aircraft 1 obtains information on the person specified by the user from the user's terminal.

Note that Embodiment 1 has described an unlimited example in which unmanned aircraft 1 autonomously performs a patrol flight along a predetermined route that has been previously set to identify suspicious person 2, and thus any method may be employed that uses unmanned aircraft 1 to identify suspicious person 2.

For example, the manipulator may identify suspicious person 2 while remotely manipulating unmanned aircraft 1 and monitoring the surveillance target area. In this case, after suspicious person 2 has been identified, the mode switches to one in which unmanned aircraft 1 performs autonomous flight, and unmanned aircraft 1 autonomously moves to the position at which unmanned aircraft 1 will prohibit suspicious person 2 from entering entry prohibited area 4.

Alternatively, unmanned aircraft 1 may hover at a predetermined location to monitor the surveillance target area and identify suspicious person 2 while monitoring.

Unmanned aircraft 1 may also move toward the position specified by an external device, and identify suspicious person 2 on the way to the specified position or while performing monitoring after arriving at the specified position.

Note that one or more, or all of the processes performed by controller 11 of unmanned aircraft 1 may be performed by an external device such as a server. In this case, unmanned aircraft 1 transmits data required by controller 11 to the external device via communication unit 105, and receives data processed by the external device. Also, one or more, or all items of information stored in memory 12 may be stored in an external device such as a server. In this case, unmanned aircraft 1 transmits via communication unit 105 data to be stored in the external device, and reads necessary data by receiving the data from the external device.

Note that Embodiment 1 has described the case where unmanned aircraft 1 prevents suspicious person 2 from moving to entry prohibited area 4 alone, but a plurality of unmanned aircrafts 1 may perform the processes according to the present disclosure in concert with each other. An example will be described in which two unmanned aircrafts A and B serve as a plurality of unmanned aircrafts 1. For example, unmanned aircraft A identifies suspicious person 2 and determines the position at which movement to entry prohibited area 4 will be prohibited. Unmanned aircraft A then requests another unmanned aircraft B which is closest to such position to move to the position at which movement to entry prohibited area 4 will be prohibited. In this case, in response to the request from unmanned aircraft A, unmanned aircraft B moves to the position at which suspicious person 2 will be prohibited from entering entry prohibited area 4 to perform a flight operation at the predetermined altitude. This prevents suspicious person 2 from moving to entry prohibited area 4. Also, unmanned aircraft B, which is closest to the position at which movement to entry prohibited area 4 will be prohibited, moves to such position, thereby enabling unmanned aircraft 1 to travel in the shortest distance/time to the position at which movement to entry prohibited area 4 will be prohibited.

When a plurality of unmanned aircrafts 1 are used and a plurality of entry prohibited areas 4 are present, the position at which movement will be prohibited is determined for each of entry prohibited areas 4, and unmanned aircrafts 1 move to the respective positions. This prohibits the entry of suspicious person 2 to the respective entry prohibited areas 4.

Another example is that each of unmanned aircrafts 1 is assigned a role and cooperates with each other in accordance with the role. Two unmanned aircrafts C and D will be described as an example. Unmanned aircraft C, for example, has a role of performing a patrol flight, detecting a person to determine whether such person is suspicious person 2, and determining the position at which movement will be prohibited to an area that is desired to be prohibited from entry. Unmanned aircraft D, for example, has a role of actually moving to the position at which movement will be prohibited to the area that is desired to be prohibited from entry. These unmanned aircrafts C and D may cooperate with each other. This enables each unmanned aircraft 1 to perform only the own task assigned, saving each unmanned aircraft 1 the trouble of performing complicated processes.

In the above description, unmanned aircraft 1 determines the position at which the movement of suspicious person 2 will be prohibited, but the supervisor, etc. at a position distant from unmanned aircraft 1 may determine such movement prohibition position.

For example, after identifying suspicious person 2, unmanned aircraft 1 may notify a terminal of the supervisor, etc. the positions of unmanned aircraft 1 and suspicious person 2. Unmanned aircraft 1 may then display on the terminal these items of position information and information on entry prohibited area 4, and the supervisor, etc. may look at these items of information to determine the movement prohibition position. When this is done, the route from suspicious person 2 to entry prohibited area 4 may be displayed together. This enables the supervisor, etc. to specify the position on the route. Also, a portion, a door, or another at which the route has a narrower width than a predetermined width may be displayed together. This enables the supervisor, etc. to specify a position at which the route has a narrow width.

Note that the terminal of the supervisor, etc. may display options from which the selection can be made of whether to cause unmanned aircraft 1 to move back and forth between the route in the width direction.

When unmanned aircraft 1 fails to move to the specified altitude at the movement prohibition position, such fact may be displayed on the terminal of the supervisor, etc. When this is done, an altitude, measured by unmanned aircraft 1, etc., at which unmanned aircraft 1 can fly at the movement prohibition position, for example, may also be displayed together. This enables the adjustment of a flight altitude of unmanned aircraft 1.

When the positions of suspicious person 2 has changed, an enquiry may be made to the supervisor, etc. about whether to change the movement prohibition position to another.

When a plurality of entry prohibited areas 4 are present, such fact may be displayed on the terminal of the supervisor, etc. so that the supervisor, etc. can select one of these areas to which entry of suspicious person 2 will be prohibited. When this is done, information such as the entry prohibition level and the movement history of suspicious person 2 (e.g., history indicating whether an area has already been entered by suspicious person 2, and so forth) may be displayed together to support the selection by the supervisor, etc.

After unmanned aircraft 1 has identified suspicious person 2, a screen may be displayed that enables the selection of whether to photograph suspicious person 2 or to prohibit the movement of suspicious person 2. A screen may also be displayed that enables the selection of whether to prohibit the entry of suspicious person 2 or to prohibit suspicious person 2 from escaping, as a way of prohibiting the movement of suspicious person 2. When this is done, information on the time that has elapsed after the entry of auspicious person 2 or information on a member of site staff who is rushing to the site (e.g., position information on the member of site staff, the time at which the member of site staff will arrive at the site), and so forth may be displayed to support the selection by the supervisor, etc.

Note that information may be displayed differently depending on the type of entry prohibited area (e.g., whether an area is one in which valuables are located, an area in which a person is present, and so forth). This enables the selection of which area to be preferentially selected.

Note that notification of the movement prohibition position determined by unmanned aircraft 1 may be sent to the terminal of the supervisor, etc.

Note that a correspondence between each location and a movement prohibition position may be previously defined so that unmanned aircraft 1, when identifying suspicious person 2, can determine the movement prohibition position on the basis of the position of the identified suspicious person 2 and the correspondence.

Effect

As described above, according to Embodiment 1 of the present disclosure, unmanned aircraft 1, after identifying suspicious person 2, moves to the air above the route leading from the position of suspicious person 2 to entry prohibited area 4 to perform a flight operation at such position. By doing this, unmanned aircraft 1 generates wind 3 toward the route along which suspicious person 2 heads for entry prohibited area 4, and thus prevents the free movement of suspicious person 2, without needing to be equipped with a new device.

Embodiment 2

Embodiment 2 will describe an exemplary case where the unmanned aircraft, after identifying suspicious person 2, estimates the direction in which suspicious person 2 is to move (referred to also as moving direction), and moves in such estimated direction ahead of suspicious person 2 to generate wind 3 by performing a flight operation at such position, thereby preventing suspicious person 2 from moving in the direction.

Figure 7:
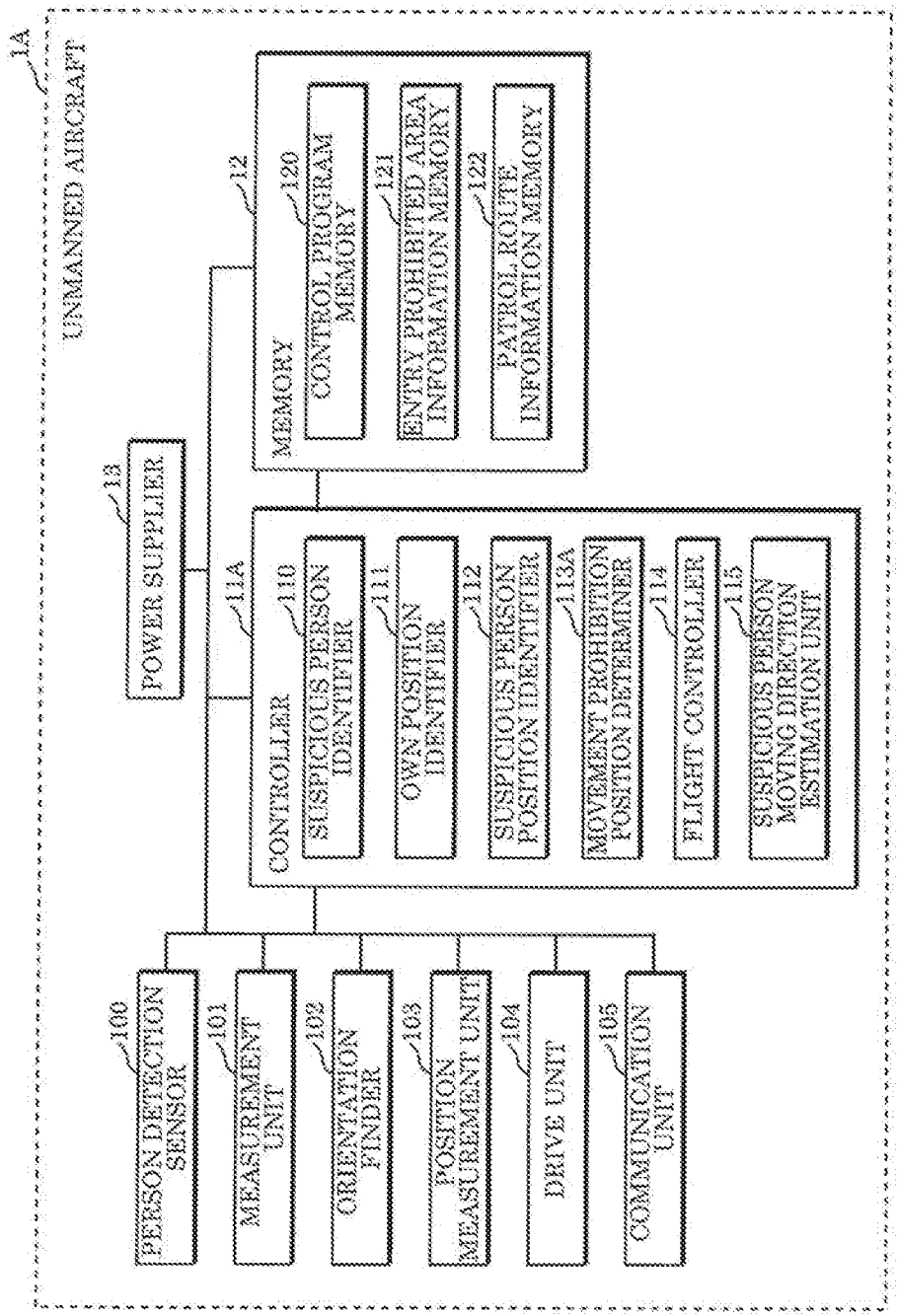
FIG. 7 is a block diagram showing the configuration of an unmanned aircraft according to Embodiment 2.

FIG. 7 is a block diagram showing the configuration of unmanned aircraft 1A according to Embodiment 2 of the present disclosure. In FIG. 7, the components similar to those in FIG. 2 are assigned the same reference marks, and their detailed descriptions will be omitted.

Unmanned aircraft 1A shown in FIG. 7 includes controller 11A instead of controller 11, compared to unmanned aircraft 1 shown in FIG. 2. When compared to controller 11, controller 11A further includes suspicious person moving direction estimation unit 115, and includes movement prohibition position determiner 113A instead of movement prohibition position determiner 113. The other components are the same as those of Embodiment 1, and thus their descriptions will be omitted.

Note that person detection sensor 100 according to Embodiment 2 includes a camera for photographing suspicious person 2. Such camera may be an infrared camera, etc. capable of taking images at night.

Suspicious person moving direction estimation unit 115 estimates the direction in which suspicious person 2 is to move from an image of suspicious person 2 photographed by person detection sensor 100. In Embodiment 2, the frontal direction of a person is detected, for example, from the photographed image of suspicious person 2 and such direction is regarded as the direction in which suspicious person 2 is to move. The frontal direction of the person is identified by pattern-recognizing the head portion of suspicious person 2 from the photographed image of suspicious person 2, and estimating the direction in which the face of suspicious person 2 is facing. Note that Embodiment 2 describes an example in which the direction of suspicious person 2 is identified by use of the direction of the face of suspicious person 2, but a portion other than the person's face may be used to identify the direction of such person. For example, the direction of the whole body, the direction of a foot, or another may be used to identify the direction of the person. Alternatively, the clothing of the person may be used to identify the direction of such person.

Note that Embodiment 2 estimates the frontal direction from a photographed image of suspicious person 2 to estimate the moving direction of suspicious person 2, but the present disclosure is not limited to this. For example, the moving direction of suspicious person 2 may be estimated by measuring the position of suspicious person 2 and estimating the direction toward which suspicious person 2 is currently moving, on the basis of changes in the position of suspicious person 2, to regard such direction as the moving direction of suspicious person 2. The moving direction of suspicious person 2 can be estimated while suspicious person 2 is moving, but the moving direction of suspicious person 2 cannot be estimated when suspicious person 2 is staying still. In view of this, the moving direction of suspicious person 2 may be estimated without use of a photographed image of suspicious person 2 when suspicious person 2 is moving, and by use of the photographed image when suspicious person 2 is staying still to estimate the frontal direction of suspicious person 2.

Movement prohibition position determiner 113A determines the position at which the movement of suspicious person 2 will be prohibited, on the basis of the position of suspicious person 2 and the moving direction of suspicious person 2 estimated by suspicious person moving direction estimation unit 115. For example, movement prohibition position determiner 113A determines, as the position at which the movement of suspicious person 2 will be prohibited, a position that is spaced apart from the position of suspicious person 2 by the predetermined distance in the moving direction of suspicious person 2 estimated by suspicious person moving direction estimation unit 115. The determination on how the position at which the movement of suspicious person 2 will be prohibited should be away from the position of suspicious person 2 may be previously made or may be made depending on situations. With reference to FIG. 8A, the following describes the case where such determination is made depending on situations.

FIG. 8A is a table showing an exemplary correspondence between the moving speed of suspicious person 2 and the distance at which unmanned aircraft 1A is to be away from suspicious person 2.

The distance at which unmanned aircraft 1A is to be away from the position of suspicious person 2 can be determined, for example, in accordance with the moving speed of suspicious person 2. When the moving speed of suspicious person 2 is fast and the destination position to which unmanned aircraft 1A is to move is close to the current position of suspicious person 2, suspicious person 2 can have already passed over such destination position when unmanned aircraft 1A has arrived at the destination position. In view of this, by setting a greater distance from the position of suspicious person 2 in accordance with the moving speed of suspicious person 2, it is possible to prohibit the movement of suspicious person 2 even when the moving speed of suspicious person 2 is fast. FIG. 8A shows an exemplary distance at which unmanned aircraft 1A is to be away from suspicious person 2 in accordance with the moving speed of suspicious person 2. FIG. 8A shows that the distance at which unmanned aircraft 1A is to be away from suspicious person 2 is gradually greater as the moving speed of suspicious person 2 is faster. This is a mere example, and thus the distance at which unmanned aircraft 1A is to be away from suspicious person 2 may become greater not gradually but successively.

With reference to FIG. 8B, the following describes another exemplary case where the determination is made depending on situations.

FIG. 8B is a table showing an exemplary correspondence between: the distance from unmanned aircraft 1A to suspicious person 2; and the distance at which unmanned aircraft 1A is to be away from suspicious person 2.

For example, the distance at which unmanned aircraft 1A is to be away from the current position of suspicious person 2 can be determined in accordance with the current distance from unmanned aircraft 1A to suspicious person 2. Unmanned aircraft 1A needs to travel to the position at which unmanned aircraft 1 will prohibit the movement of suspicious person 2, and thus the determination on how the position should be away from the position of suspicious person 2 may be made in consideration of the time required for such traveling. This is applicable to the case, however, where suspicious person 2 is moving away from unmanned aircraft 1A. FIG. 8B shows an exemplary distance at which unmanned aircraft 1A is to be away from suspicious person 2 in accordance with the distance between unmanned aircraft 1A and suspicious person 2. FIG. 8B shows that the distance at which unmanned aircraft 1A is to be away from suspicious person 2 is gradually greater as the distance between unmanned aircraft 1A and suspicious person 2 is greater. This is a mere example, and thus the distance at which unmanned aircraft 1A is to be away from suspicious person 2 may become greater not gradually but successively. The distance (the shortest distance) from unmanned aircraft 1A to suspicious person 2 is considered in the present description, but the travel distance (i.e., the way) through the route from unmanned aircraft 1A to suspicious person 2 may be considered. The determination on the distance at which unmanned aircraft 1A is to be away from the current position of suspicious person 2 may also be made in accordance with a required travel time, instead of the distance from unmanned aircraft 1A to suspicious person 2.

Also note that the determination on how the position to be determined as the destination position is to be away from the position of suspicious person 2 may be made in consideration of both the moving speed of suspicious person 2 and the distance from unmanned aircraft 1A to suspicious person 2.

FIG. 9 is a flowchart showing the flow of processes performed by unmanned aircraft 1A according to Embodiment 2 of prohibiting the movement of suspicious person 2. More specifically, FIG. 9 is a diagram showing a flowchart of the processes performed by unmanned aircraft 1A according to Embodiment 2 of performing an operation of moving in the moving direction ahead of suspicious person 2 to prohibit the movement of suspicious person 2. In FIG. 9, the components similar to those in FIG. 5 are assigned the same reference marks, and their detailed descriptions will be omitted.

The flowchart shown in FIG. 9 is different from the flowchart shown in FIG. 5 in the processes of step S11 and step S12.

After unmanned aircraft 1A has detected suspicious person 2 and identified the position of suspicious person 2, suspicious person moving direction estimation unit 115 estimates the moving direction of suspicious person 2 (step S11). Suspicious person moving direction estimation unit 115 according to Embodiment 2 detects the frontal direction of the person from the photographed image of auspicious person 2 obtained by person detection sensor 100 and estimates such direction as the direction in which auspicious person 2 is to move. The frontal direction of the person is identified by pattern-recognizing the head portion of suspicious person 2 from the photographed image of suspicious person 2, and estimating the direction in which the face of suspicious person 2 is facing. Note that Embodiment 2 describes an example in which the direction of suspicious person 2 is identified by use of the direction of the face of suspicious person 2, but a portion other than the person's face may be used to identify the direction of such person. For example, the direction of the whole body, the direction of a foot, or another may be used to identify the direction of the person.

Next, movement prohibition position determiner 113A determines the position at which the movement of suspicious person 2 will be prohibited, on the basis of the position of suspicious person 2 and the moving direction of suspicious person 2 estimated by suspicious person moving direction estimation unit 115 (step S12). Movement prohibition position determiner 113A according to Embodiment 2 determines, as the position at which the movement of suspicious person 2 will be prohibited, a position that is spaced apart from the position of suspicious person 2 by the predetermined distance in the moving direction of suspicious person 2 estimated by suspicious person moving direction estimation unit 115.

Flight controller 114 then causes unmanned aircraft 1A to move to the position determined by movement prohibition position determiner 113A to perform a flight operation at such position, thereby generating wind 3.

Through the above processes, unmanned aircraft 1A goes in the direction in which suspicious person 2 is to move ahead of suspicious person 2 and generates wind 3 by performing a flight operation at such position. This prevents suspicious person 2 from moving in the direction in which suspicious person 2 is to move.

Note that unmanned aircraft 1A may further update the position at which unmanned aircraft 1A will prohibit the movement of suspicious person 2. For example, unmanned aircraft 1A may regularly update the position at which unmanned aircraft 1A will prohibit the movement of suspicious person 2 while traveling to the position at which unmanned aircraft 1A will prohibit the movement of suspicious person 2. "Regularly" here means "every time predetermined time has elapsed", "every time a predetermined distance has been traveled", or "at every predetermined time". This enables unmanned aircraft 1A to appropriately travel to the position at which unmanned aircraft 1A will prohibit the movement of suspicious person 2 even when suspicious person 2 has changed the moving direction or the moving speed to another.

Note that Embodiment 2 has described an example in which the movement of suspicious person 2 in the direction in which suspicious person 2 is to move is prevented, but unmanned aircraft 1A may prevent the movement of suspicious person 2 in the direction in which suspicious person 2 is to move when such direction is in the direction toward a predetermined area.

For example, flight controller 114 may cause unmanned aircraft 1A to move to a position between entry prohibited area 4 and suspicious person 2, on the basis of the positional relation between suspicious person 2 and entry prohibited area 4 and the direction in which suspicious person 2 is to move. More specifically, flight controller 114 may cause unmanned aircraft 1A to move to a position between entry prohibited area 4 and suspicious person 2, only when the direction in which suspicious person 2 is to move is the direction toward entry prohibited area 4 described in Embodiment 1, and prevent suspicious person 2 from moving in the direction in which suspicious person 2 is to move. Unmanned aircraft 1A may also prevent suspicious person 2 from moving in the direction in which suspicious person 2 is to move when the route from the position of suspicious person 2 to entry prohibited area 4 is present in such moving direction of suspicious person 2.

In another example, unmanned aircraft 1A may prevent suspicious person 2 from moving in the direction in which suspicious person 2 is to move, when such moving direction is toward an area other than the area to which suspicious person 2 is to be directed. Note that unmanned aircraft 1A may also prevent suspicious person 2 from moving in the direction in which suspicious person 2 is to move, when the route from the position of suspicious person 2 to the area to which suspicious person 2 is to be directed is not present in such moving direction of suspicious person 2.

This enables unmanned aircraft 1A to prevent suspicious person 2 from moving in the direction in which suspicious person 2 is to move only when a predetermined condition is satisfied, and thus to reduce battery consumption.

Furthermore, to reduce battery consumption of unmanned aircraft 1A, unmanned aircraft 1A may prevent suspicious person 2 from moving in the direction in which suspicious person 2 is to move when suspicious person 2 is present within a predetermined range and the moving direction of suspicious person 2 is toward the predetermined area. For example, unmanned aircraft 1A may prevent suspicious person 2 from moving in the direction in which suspicious person 2 is to move only when suspicious person 2 is present close to entry prohibited area 4 and the moving direction of suspicious person 2 is toward entry prohibited area 4.

Furthermore, to reduce battery consumption of unmanned aircraft 1A, unmanned aircraft 1A may perform a process of preventing suspicious person 2 from moving in the direction in which suspicious person 2 is to move only while suspicious person 2 is present within a predetermined area. For example, when such predetermined area is an area leading to the room where valuables are located, unmanned aircraft 1A may perform the process of preventing suspicious person 2 from moving in the direction in which suspicious person 2 is to move, only when suspicious person 2 is present in such area.

Note that Embodiment 2 has described an example in which unmanned aircraft 1A estimates the direction in which suspicious person 2 is to move, and determines the position at which unmanned aircraft 1A will prohibit the movement of suspicious person 2 on the basis of the estimated direction, but the present disclosure is not limited to this. For example, flight controller 114 may cause unmanned aircraft 1 to move to a position between entry prohibited area 4 and suspicious person 2 only when suspicious person 2 has actually moved in the direction in which suspicious person 2 is to move. Stated differently, unmanned aircraft A may identify the direction in which suspicious person 2 is actually moving, and determine the position at which unmanned aircraft 1A will prohibit the movement of suspicious person 2, on the basis of such identified direction. The direction in which suspicious person 2 is actually moving can be identified on the basis of changes in the position of suspicious person 2 that has been measured at least two times at some time intervals. This enables unmanned aircraft 1A to go in the direction in which suspicious person 2 is actually moving ahead of such suspicious person 2, and thus prevent the movement of suspicious person 2.

As described in Embodiment 2, when the direction in which suspicious person 2 is to move is estimated to determine the position at which the movement of suspicious person 2 will be prohibited on the basis of such estimated position, it is unknown whether suspicious person 2 will actually move in such direction. As such, in some cases, when suspicious person 2 does not move in such direction, unmanned aircraft 1A performs, in vain, a process of moving to the position at which unmanned aircraft 1A will prohibit the movement of suspicious person 2. However, there is an advantage of being able to preventatively prohibit the movement of suspicious person 2 when unmanned aircraft 1A moves to the position at which unmanned aircraft 1A will prohibit the movement of suspicious person 2 before suspicious person 2 actually starts moving.

Note that Embodiment 2 has described an example in which the position that is spaced apart from the position of suspicious person 2 by the predetermined distance in the moving direction of suspicious person 2 is determined as the position at which the movement of suspicious person 2 will be prohibited, but another position may be determined that is present in the moving direction of suspicious person 2 from the position of suspicious person 2.

For example, when the moving direction in which suspicious person 2 is to move is toward entry prohibited area 4 described in Embodiment 1, and unmanned aircraft 1 will prevent suspicious person 2 from moving in the direction in which suspicious person 2 is to move, not a position that is spaced apart from the position of suspicious person 2 by the predetermined distance but a position that is spaced apart from entry prohibited area 4 by the predetermined distance may be determined as the position at which the movement of suspicious person 2 will be prohibited.

To widely prevent the movement of suspicious person 2 in the direction in which suspicious person 2 is to move, unmanned aircraft 1A may fly around the position at which unmanned aircraft 1A will prohibit the movement of suspicious person 2 to generate wind 3 toward the surroundings of such position. This will be described below with reference to FIG. 10A and FIG. 10B.

Figure 10A:
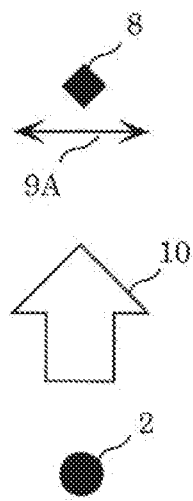
FIG. 10A is a diagram showing an exemplary flight direction in which the unmanned aircraft according to Embodiment 2 flies around the position at which the unmanned aircraft will prohibit the movement of the suspicious person.
Figure 10B:
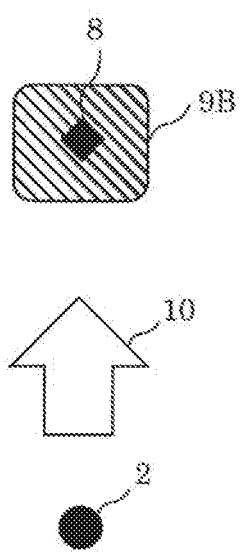
FIG. 10B is a diagram showing an exemplary flight area in which the unmanned aircraft according to Embodiment 2 flies around the position at which the unmanned aircraft will prohibit the movement of the suspicious person.

FIG. 10A is a diagram showing an exemplary flight direction in which unmanned aircraft 1A according to Embodiment 2 flies around the position at which unmanned aircraft 1A will prohibit the movement of suspicious person 2. FIG. 10B is a diagram showing an exemplary flight area in which unmanned aircraft 1A according to Embodiment 2 flies around the position at which unmanned aircraft 1A will prohibit the movement of suspicious person 2. FIG. 10A and FIG. 10B are bird's eye views illustrating exemplary images of unmanned aircraft 1A flying around the position at which unmanned aircraft 1A will prohibit the movement of suspicious person 2. FIG. 10A shows an exemplary image of unmanned aircraft 1A flying back and forth in the left and right directions as represented by double-headed arrow 9A with respect the center, which is the position at which unmanned aircraft 1A will prohibit suspicious person 2 from moving to position 8 represented by a diamond-shaped mark, when suspicious person 2 represented by the black circle tries to move in the direction indicated by arrow 10. FIG. 10B shows an image of unmanned aircraft 1A flying within shaded area 9B with respect to position 8 represented by a diamond-shaped mark serving as the center, when suspicious person 2 represented by the black circle tries to move in the direction indicated by arrow 10. Note that examples shown in FIG. 10A and FIG. 10B are mere examples, and thus unmanned aircraft 1A may fly in any manner so long as unmanned aircraft A flies around the position at which unmanned aircraft 1A will prohibit the movement of suspicious person 2.

This configuration enables unmanned aircraft 1A to widely generate wind 3 on the route that is present in the direction in which suspicious person 2 is to move, and thus to widely prevent suspicious person 2 from moving in the direction in which suspicious person 2 is to move.

Effect

As described above, according to Embodiment 2 of the present disclosure, unmanned aircraft 1A estimates the direction in which suspicious person 2 is to move, and move in such direction ahead of suspicious person 2 to generate wind 3 at such position by its flight operation. This prevents suspicious person 2 from moving in the direction in which suspicious person 2 is to move.

Note that the surveillant, etc. may estimate the moving direction of suspicious person 2.

For example, unmanned aircraft 1A may send to a terminal of the surveillant, etc. a notification about information obtained by photographing suspicious person 2 (image and so forth), and the surveillant, etc. may estimate the direction in which suspicious person 2 is to move, on the basis of such information.

Note that the surveillant, etc. may determine the direction in which suspicious person 2 is to move, depending on which unmanned aircraft 1A will or will not perform an operation of preventing the movement of suspicious person 2. In so doing, to support the surveillant, etc. determining which direction to select, information such as information on entry prohibited area 4 or an area to which suspicious person 2 is to be directed may be additionally displayed on the terminal of the surveillant, etc. together with the position of suspicious person 2 and the position of unmanned aircraft 1A.

For an easy determination of the surveillant, etc. about whether to cause unmanned aircraft 1A to perform an operation of preventing the movement of suspicious person 2, the battery status of unmanned aircraft 1A may also be displayed together.

Embodiment 3

Embodiment 3 will describe an example in which the unmanned aircraft moves to the position at which the unmanned aircraft will prohibit the movement of suspicious person 2, and further controls wind 3 to subject suspicious person 2 to wind 3 that is generated by performing a flight operation, when suspicious person 2 is approaching the unmanned aircraft.

Figure 11:
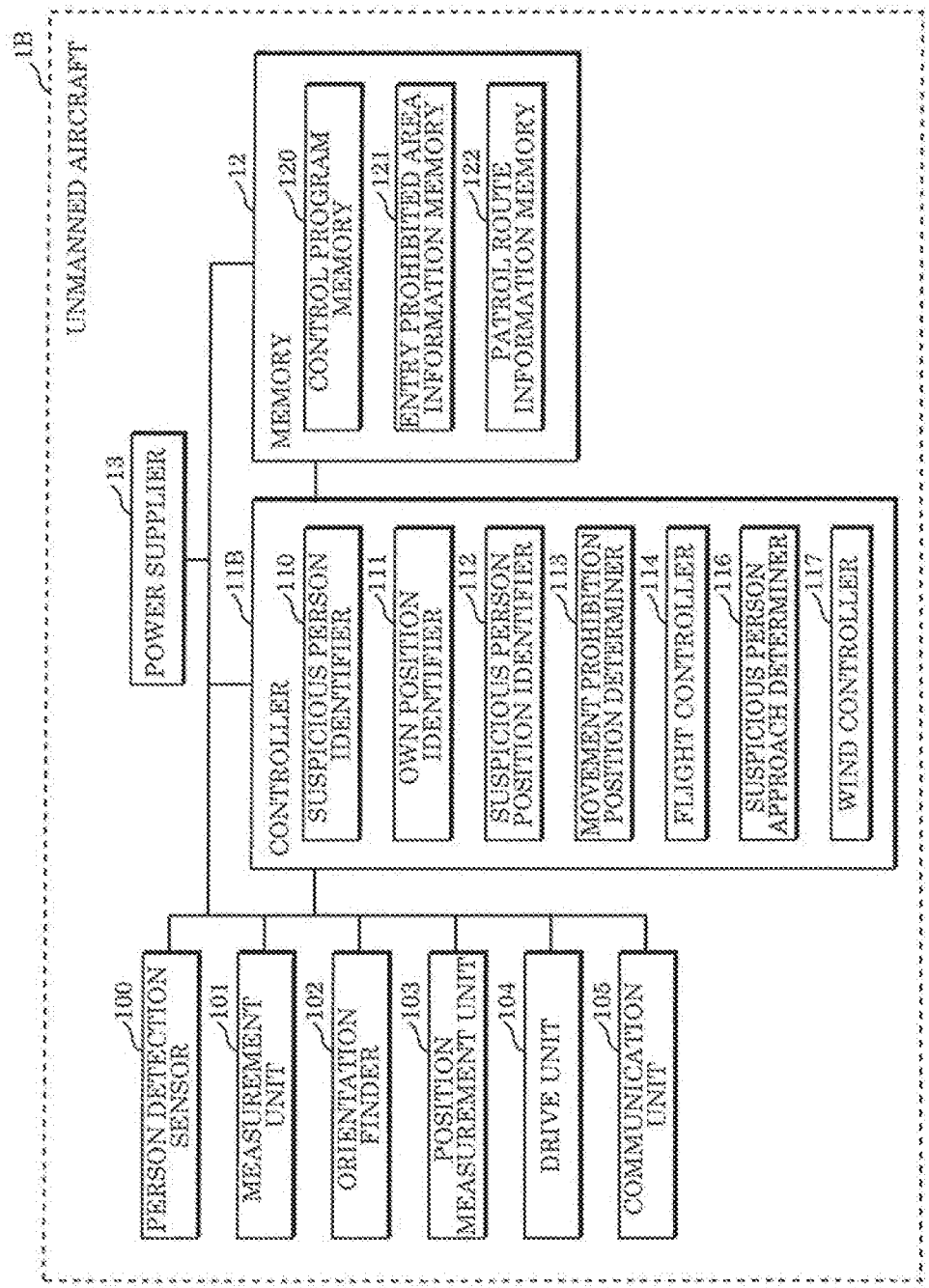
FIG. 11 is a block diagram showing the configuration of an unmanned aircraft according to Embodiment 3.

FIG. 11 is a block diagram showing the configuration of unmanned aircraft 1B according to Embodiment 3. In FIG. 11, the components similar to those in FIG. 2 are assigned the same reference marks, and their detailed descriptions will be omitted.

Unmanned aircraft 1B shown in FIG. 11 includes controller 11B instead of controller 11, when compared to unmanned aircraft 1 shown in FIG. 2. Controller 11B further includes suspicious person approach determiner 116 and wind controller 117, when compared to controller 11. The other components are the same as those of Embodiment 1, and thus their descriptions will be omitted.

Suspicious person approach determiner 116 determines whether suspicious person 2 is approaching unmanned aircraft 1B. More specifically, suspicious person approach determiner 116 determines that suspicious person 2 is approaching unmanned aircraft 1B when determining that the distance from unmanned aircraft 1B to suspicious person 2 measured by use of measurement unit 101 is smaller than a predetermined distance, and determines that suspicious person 2 is not approaching unmanned aircraft 1B when such distance is equal to or greater than the predetermined distance.

Wind controller 117 is an example of the flight controller that performs wind-blow control for controlling unmanned aircraft 1B to cause wind 3 generated by the flight of unmanned aircraft 1B to be blown to suspicious person 2, when suspicious person 2 is approaching unmanned aircraft 1B. Wind controller 117 controls wind 3 generated by the flight operation performed by unmanned aircraft 1B. More specifically, wind controller 117 controls the rotational speeds of the propellers of unmanned aircraft 1B to control the position and attitude of unmanned aircraft 1B, thereby controlling the strength or the direction of the resulting wind 3. Wind controller 117 also controls the distance between unmanned aircraft 1B and a target to be subjected to wind 3, and controls the strength of wind 3 at which the target is to be subjected to wind 3.

With reference to FIG. 12A through FIG. 12D, Embodiment 3 describes wind 3 that is generated by the flight operation performed by unmanned aircraft 1B having, for example, four propellers. Such unmanned aircraft 1B is capable of generating wind 3 in a vertically downward direction from the aircraft body by rotating the propellers. Unmanned aircraft 1B is capable of changing the moving direction and the tilt of the aircraft body by controlling the rotational speeds of the propellers. Such capability is used to control the direction or the strength of wind 3.

FIG. 12A through FIG. 12D are diagrams showing exemplary characteristics of wind 3 generated by the flight operation of unmanned aircraft 1B according to Embodiment 3. FIG. 12A through FIG. 12D each shows the direction in which unmanned aircraft 1B is to move and the tilt of the aircraft body when unmanned aircraft 1B changes the rotational speed of each propeller from the state of flying still in the air, and the characteristics of the resulting wind 3.

FIG. 12A shows the way unmanned aircraft B moves when the rotational speeds of all four propellers are increased, and the characteristics of the resulting wind 3. When the rotational speeds of all four propellers are increased, unmanned aircraft 1B moves in a vertically upward direction. The resulting wind 3 is stronger than the wind before the rotational speeds are increased.

FIG. 12B shows the way unmanned aircraft 1B moves when the rotational speeds of all four propellers are decreased, and the characteristics of the resulting wind 3. When the rotational speeds of all four propellers are decreased, unmanned aircraft 1B moves in a vertically downward direction. The resulting wind 3 is weaker than the wind before the rotational speeds are decreased.

FIG. 12C shows the way unmanned aircraft 1B moves when the rotational speeds of two of the four propellers located at the left side, for example, are decreased and the rotational speeds of two of the four propellers located at the right side, for example, are increased, and the characteristics of the resulting wind 3. When the rotational speeds of the two propellers at the left side are decreased and the rotational speeds of the two propellers at the right side are increased, unmanned aircraft 1B is tilted in a manner that the right side of the aircraft body is higher than the left side, and moves leftward in such state. The direction of the resulting wind 3 is toward the lower right of the aircraft body because of the tilted aircraft body.

FIG. 12D shows the way unmanned aircraft 1B moves when the rotational speeds of two of the four propellers located at the right side, for example, are decreased and the rotational speeds of two of the four propellers located at the left side, for example, are increased, and the characteristics of the resulting wind 3. When the rotational speeds of the two propellers at the right side are decreased and the rotational speeds of the two propellers at the left side are increased, unmanned aircraft 1B is tilted in a manner that the left side of the aircraft body is higher than the right side, and moves rightward in such state. The direction of the resulting wind 3 is toward the lower left of the aircraft body because of the tilted aircraft body.

Figure 13:
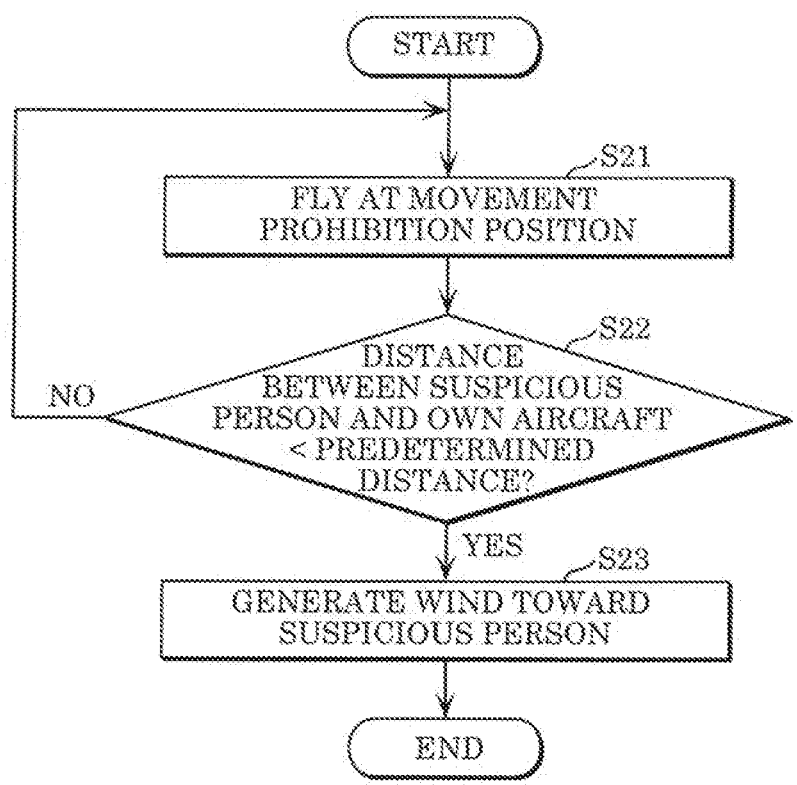
FIG. 13 is a flowchart showing the flow of processes performed by the unmanned aircraft according to Embodiment 3 of prohibiting the movement of the suspicious person.

FIG. 13 is a flowchart showing the flow of processes performed by unmanned aircraft 1B according to Embodiment 3 of prohibiting the movement of suspicious person 2. FIG. 13 is a diagram showing a flowchart of processes performed by unmanned aircraft 1B according to Embodiment 3 of performing an operation of blowing wind 3 to suspicious person 2 when suspicious person 2 is approaching unmanned aircraft 1B after unmanned aircraft 1B has arrived at the position at which unmanned aircraft 1B will prohibit the movement of suspicious person 2.

After arriving at the position at which unmanned aircraft 1B will prohibit the movement of suspicious person 2, unmanned aircraft 1B performs a flight operation at such position, thereby generating wind 3 (step S21).

Figure 14:
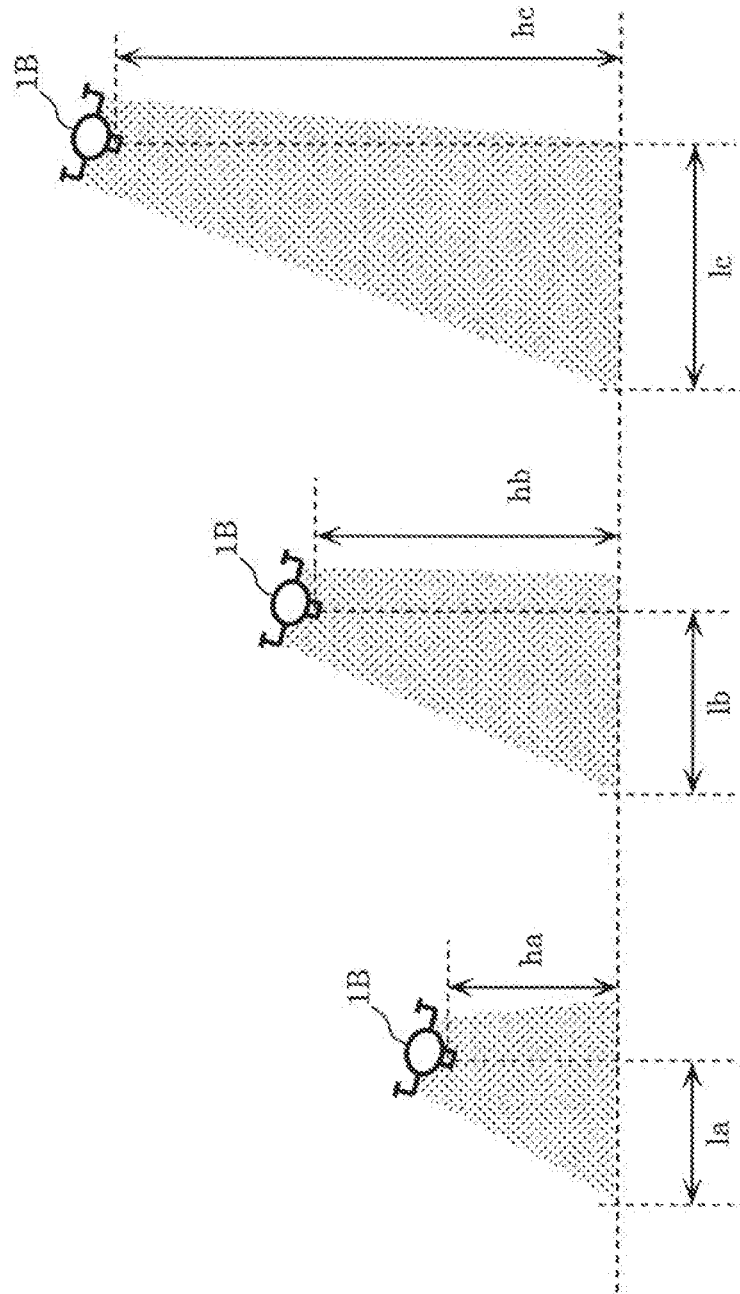
FIG. 14 is a diagram showing ranges within reach of wind for the respective flight altitudes of the unmanned aircraft according to Embodiment 3.

Next, suspicious person approach determiner 116 measures the distance between suspicious person 2 and the own aircraft by use of measurement unit 101 to determine whether the distance between suspicious person 2 and the own aircraft is smaller than the predetermined distance (step S22). To reliably subject suspicious person 2 to wind 3, Embodiment 3 sets as the predetermined distance a distance across which wind 3 reaches suspicious person 2. The distance within reach of wind 3 from unmanned aircraft 1B differs depending on flight altitude. As such, the distance within reach of wind 3 may be determined in accordance with the flight altitude at which unmanned aircraft 1B performs a flight operation at the position at which unmanned aircraft 1B will prohibit the movement of suspicious person 2. With reference to FIG. 14, the following describes the ranges within reach of wind 3.

FIG. 14 is a diagram showing ranges within reach of wind 3 for the respective flight altitudes of unmanned aircraft 1B according to Embodiment 3. As shown in FIG. 14, the distance within reach of wind 3 is greater as shown as la, lb, and le, as the flight altitude of unmanned aircraft 1B is higher as shown as ha, hb, and hc.

In order that unmanned aircraft 1B can determine the predetermined distance described above: information indicating the distance within reach of wind 3 for each flight altitude of unmanned aircraft 1B may be previously stored in memory 12; the flight altitude may be measured at which unmanned aircraft 1B flies at the position at which unmanned aircraft 1B will prohibit the movement of suspicious person 2; the distance within reach of wind 3 may be extracted by comparing, on the basis of the flight altitude having been measured, the information and such flight altitude; and such extracted distance within reach of wind 3 may be determined as the predetermined distance. In this case, unmanned aircraft 1B uses, for example, a horizontal distance between suspicious person 2 and the own aircraft to determine whether such horizontal distance between suspicious person 2 and the own aircraft is smaller than the predetermined distance. When the flight altitude at which unmanned aircraft 1B performs a flight operation at the position at which unmanned aircraft 1B will prohibit the movement of suspicious person 2 is previously fixed, the distance within reach of wind 3 corresponding to such flight altitude may be previously determined as the predetermined distance. Also, instead of previously storing in memory 12 the information indicating the distance within reach of wind 3 for each flight altitude, the distance within reach of wind 3 corresponding to each flight altitude of unmanned aircraft 1B may be calculated on the basis of information on the flight altitude and the maximum angle of the tilt of the aircraft body. Note that a portion of suspicious person 2 to be subjected to wind 3 is not considered in this case. However, considering the case where a specific portion of suspicious person 2, or more specifically, the face, the upper body, or another of suspicious person 2 will be subjected to wind 3, for example, unmanned aircraft 1B may measure the height of suspicious person 2 to identify the position of the face or the upper body, and then determine the distance across which wind 3 travels to reach such position.

To reliably subject suspicious person 2 to wind 3, Embodiment 3 sets, as the predetermined distance, a distance across which wind 3 reaches suspicious person 2, but the present disclosure is not limited to this. For example, to reliably subject suspicious person 2 to wind 3 and further intimidate suspicious person 2 by wind 3, unmanned aircraft 1B may determine, as the predetermined distance, a distance that is longer than the distance across which wind 3 reaches suspicious person 2 (e.g., distance that is about two meters longer than the distance across which wind 3 reaches suspicious person 2).

Back to the description with reference to FIG. 13, when the distance between suspicious person 2 and the own aircraft is equal to or greater than the predetermined distance (NO in step S22), the process returns to step S21, and unmanned aircraft 1B performs a flight operation at the position at which unmanned aircraft 1B will prohibit the movement of suspicious person 2 to continue the process of determining whether suspicious person 2 is approaching.

When the distance between suspicious person 2 and the own aircraft is smaller than the predetermined distance (YES in step S22), wind controller 117 controls unmanned aircraft 1B so that unmanned aircraft 1B generates wind 3 toward suspicious person 2 to subject suspicious person 2 to wind 3 (step S23).

Figure 15:
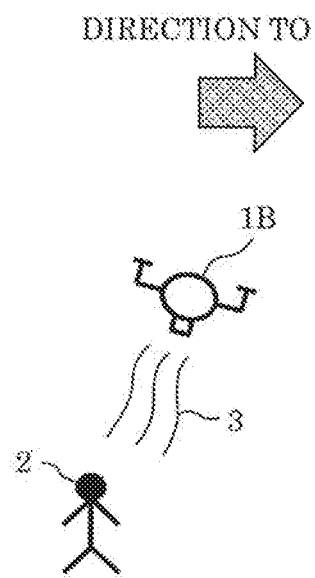
FIG. 15 is a conceptual diagram showing an image of an operation performed by the unmanned aircraft according to Embodiment 3 of subjecting the suspicious person to wind.

FIG. 15 is a conceptual diagram showing an image of an operation performed by unmanned aircraft 1B according to Embodiment 3 of subjecting suspicious person 2 to wind 3. FIG. 15 illustrates a situation in which unmanned aircraft 1B is generating wind 3 toward suspicious person 2. Unmanned aircraft 1B is illustrated as being tilted in a manner that the left side of the aircraft body is higher than the right side to direct wind 3 toward suspicious person 2 who is located in a leftward direction of the aircraft body.

Unmanned aircraft 1B blows wind 3 to suspicious person 2 with the aircraft body tilted as shown in FIG. 15, thereby preventing suspicious person 2 from approaching unmanned aircraft 1B. When unmanned aircraft 1B blows wind 3 from the air above suspicious person 2, suspicious person 2 will move in a random direction to escape from wind 3. This can allow suspicious person 2 to move in an undesired direction. For example, suspicious person 2 can move in the direction toward entry prohibited area 4 to escape from wind 3. In view of this, unmanned aircraft 1B blows wind 3 toward suspicious person 2 with the aircraft body tilted as shown in FIG. 15.

By performing flight control for tilting the aircraft body as described above, unmanned aircraft 1B moves in the direction indicated by the arrow shown in FIG. 15. Stated differently, when tilting the aircraft body in a manner that wind 3 is blown toward suspicious person 2, unmanned aircraft 1B moves in a direction away from suspicious person 2. For this reason, the more unmanned aircraft 1B moves in a direction away from suspicious person 2, the less wind 3 is blown to suspicious person 2.

In view of this, unmanned aircraft 1B may return to the original position of the aircraft body by moving, by the amount the aircraft body has moved, in the opposite direction to the direction in which the aircraft body has moved, and blow wind to suspicious person 2 again. This enables unmanned aircraft 1B to blow wind 3 to suspicious person 2 again. Note that unmanned aircraft 1B may repeat the operation of returning to the original position of the aircraft body by moving, by the amount the aircraft body has moved, in the opposite direction to the direction in which the aircraft body has moved, and blowing wind to suspicious person 2 again. This enables unmanned aircraft 1B to continuously blow wind 3 to suspicious person 2. This will be described below with reference to FIG. 16.

Figure 16:
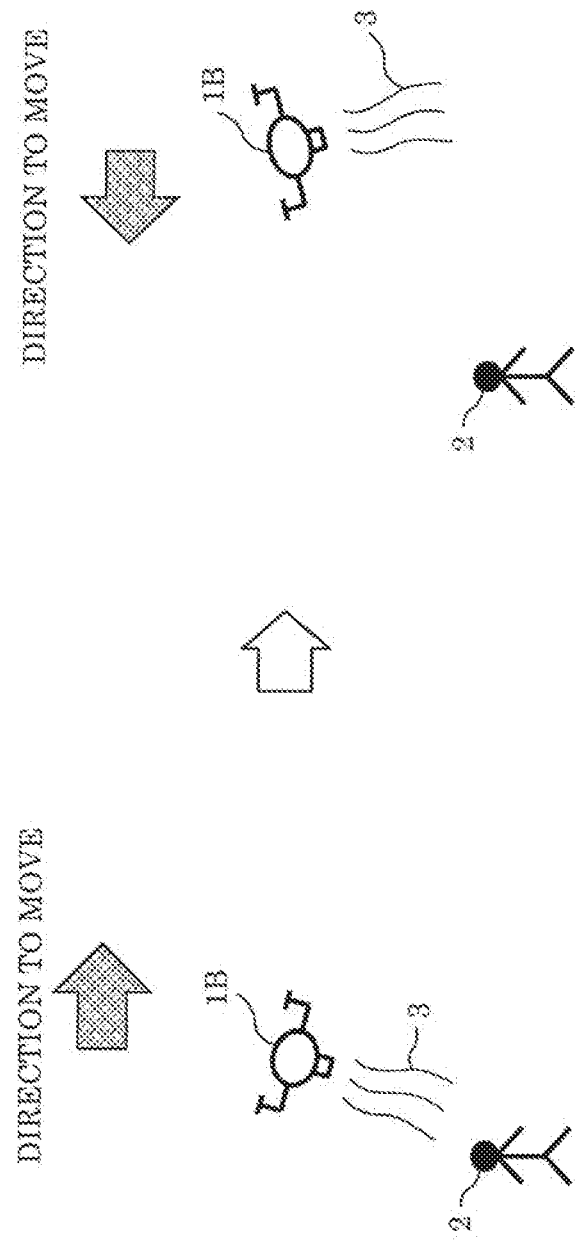
FIG. 16 is a conceptual diagram showing an exemplary process performed on the suspicious person by the unmanned aircraft according to Embodiment 3 after subjecting the suspicious person to wind.

FIG. 16 is a conceptual diagram showing an exemplary process performed on suspicious person 2 by unmanned aircraft 1B according to Embodiment 3 after subjecting suspicious person 2 to wind 3. FIG. 16 illustrates a state in which unmanned aircraft 1B returns to the original position of the aircraft body by moving, by the amount the aircraft body has moved, in the opposite direction to the direction in which the aircraft body has moved. The left-side illustration in FIG. 16 shows a state in which unmanned aircraft 1B is tilted in a manner that the left side of the aircraft body is higher than the right side to blow wind 3 to suspicious person 2, as a result of which unmanned aircraft 1B moves in the opposite direction to suspicious person 2. The right-side illustration in FIG. 16 shows a state in which unmanned aircraft 1B moves, by the amount the aircraft body has moved as a result of blowing wind 3 to suspicious person 2, in the opposite direction to the direction in which the aircraft body has moved. When moving in the opposite direction to the direction in which the aircraft body has moved, unmanned aircraft 1B is tilted in a manner that the right side of the aircraft body is higher than the left side. As a result, wind 3 blows in a lower right direction, and thus suspicious person 2 will not be subjected wind 3 when the aircraft body is returning to the original position.

Note that flight controller 114 may further adjust the wind-blow control, on the basis of changes in the position of suspicious person 2 resulted from performing the wind-blow control. More specifically, when suspicious person 2 is approaching unmanned aircraft 1B despite being subjected to wind 3, unmanned aircraft 1B may continue to move in the opposite direction to the direction in which suspicious person 2 is present (i.e., the moving direction of suspicious person 2) in step with the movement of suspicious person 2 to subject suspicious person 2 to wind 3. For example, the moving speed of suspicious person 2 is measured to cause unmanned aircraft 1B to move in the opposite direction to the direction in which suspicious person 2 is present at the same moving speed as that of suspicious person 2 at a flight altitude from which wind 3 can be blown to suspicious person 2. This enables unmanned aircraft 1B to continuously subject suspicious person 2 to wind 3. This will be described below with reference to FIG. 17.

Figure 17:
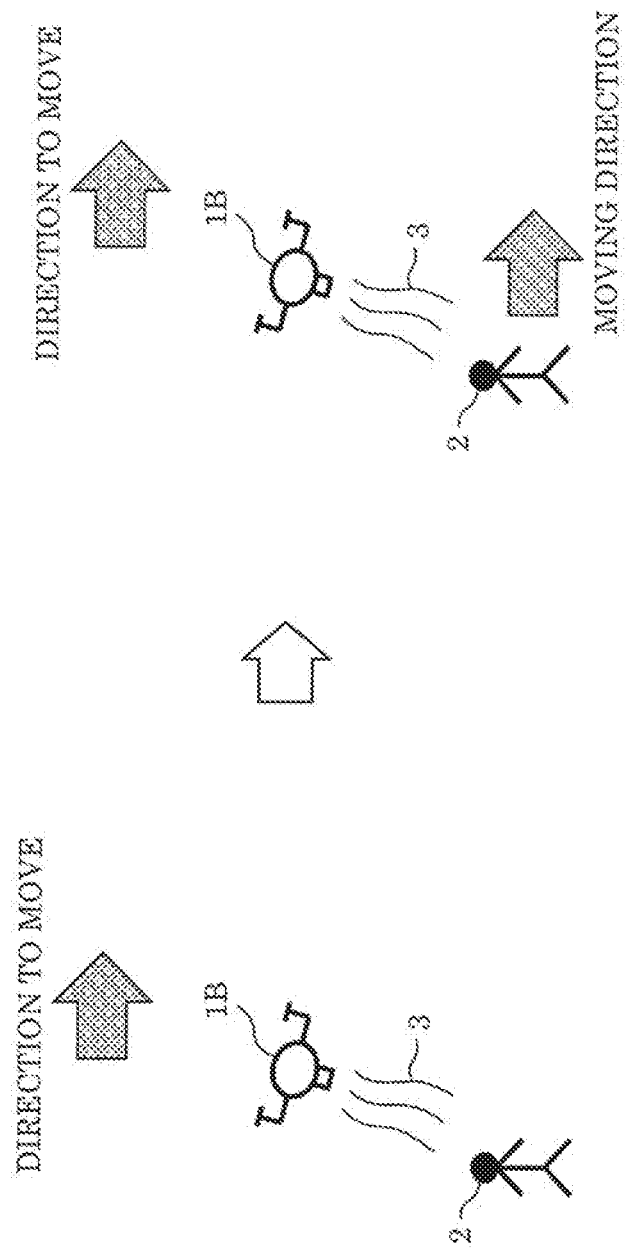
FIG. 17 is a conceptual diagram showing another exemplary process performed on the suspicious person by the unmanned aircraft according to Embodiment 3 after subjecting the suspicious person to wind.

FIG. 17 is a conceptual diagram showing another exemplary process performed on suspicious person 2 by unmanned aircraft 1B according to Embodiment 3 after subjecting suspicious person 2 to wind 3. FIG. 17 illustrates a situation in which unmanned aircraft 1B continues to move in the opposite direction to suspicious person 2 in step with the movement of suspicious person 2, who has moved toward unmanned aircraft 1B after being subjected to wind 3. The left-side illustration in FIG. 17 shows a situation in which unmanned aircraft 1B moves in the opposite direction to suspicious person 2 to subject suspicious person 2 to wind 3. The right-side illustration in FIG. 17 shows a situation in which unmanned aircraft 1B continues to move in the opposite direction to suspicious person 2 in step with the movement of suspicious person 2, who has moved toward unmanned aircraft 1B after being subjected to wind 3 and continuously blows wind 3 to suspicious person 2.

When suspicious person 2 is approaching unmanned aircraft 1B despite being subjected to wind 3, unmanned aircraft 1B may subject suspicious person 2 to stronger wind 3 that unmanned aircraft 1B generates. To subject suspicious person 2 to stronger wind 3 that unmanned aircraft 1B generates, for example, unmanned aircraft 1B may shorten the distance from unmanned aircraft 1B to suspicious person 2. This enables unmanned aircraft 1B to subject suspicious person 2 to wind 3 that unmanned aircraft 1B generates from a distance closer to suspicious person 2, thereby subjecting suspicious person 2 to stronger wind 3.

In another example, unmanned aircraft 1B may generate stronger wind 3 by increasing the overall rotational speeds of the propellers to subject suspicious person 2 to stronger wind 3 that unmanned aircraft 1B generates. This increases the strength of wind 3 per se generated by unmanned aircraft 1B, thereby subjecting suspicious person 2 to stronger wind 3. This is effective when the strength of wind 3 is increased temporarily because unmanned aircraft 1B needs to move in a direction that is away from suspicious person 2 to increase the overall rotational speeds of the propellers.

Note that flight controller 114 may perform wind-blow control when the position of suspicious person 2 is within the predetermined distance from entry prohibited area 4. More specifically, unmanned aircraft 1B may determine whether to approach suspicious person 2 to blow wind 3 again or to terminate the process of subjecting suspicious person 2 to wind 3, depending on the position of suspicious person 2, when suspicious person 2 has moved in a direction away from unmanned aircraft 1B as a result to being subjected to wind 3. For example, when determining that the position of suspicious person 2 is spaced apart from entry prohibited area 4 by a predetermined distance or greater as a result of subjecting suspicious person 2 to wind 3, unmanned aircraft 1B may terminate the process of subjecting suspicious person 2 to wind 3. When determining that the position of suspicious person 2 is spaced apart from entry prohibited area 4 only less than the predetermined distance, unmanned aircraft 1B may approach suspicious person 2 to subject suspicious person 2 to wind 3 again. Note that wind 3 may be blown to suspicious person 2 in a non-limited manner when suspicious person 2 has moved in a direction that is away from entry prohibited area 4 as a result of being subjected to wind 3. For example, unmanned aircraft 1B may continue to subject suspicious person 2 to wind 3 for a predetermined period even when suspicious person 2 has moved in a direction away from entry prohibited area 4. Also, unmanned aircraft 1B may continue to subject suspicious person 2 to wind 3 until when a total distance for which suspicious person 2 has moved away from unmanned aircraft 1B amounts to a predetermined value or greater. Alternatively, the number of times for subjecting suspicious person 2 to wind 3 may be previously specified so that unmanned aircraft 1B subjects suspicions person 2 to wind 3 for such number of times.

Through the above processes, unmanned aircraft 1B moves to the position at which unmanned aircraft 1B will prohibit the movement of suspicious person 2, and further controls wind 3 so that suspicious person 2 will be subjected to wind 3 generated by its flight operation, when suspicious person 2 is approaching. Unmanned aircraft 1 is thus capable of prohibiting the movement of suspicious person 2.

Note that Embodiment 3 has described an example in which unmanned aircraft 1B subjects suspicious person 2 to wind 3 when suspicious person 2 is approaching unmanned aircraft 1B, but unmanned aircraft 1B may aggressively approach suspicious person 2 to subject suspicious person 2 to wind 3.

When wishing to cause suspicious person 2 to move away in a predetermined direction from the current position of suspicious person 2, for example, unmanned aircraft 1B may move to a position which is spaced apart from the position of suspicious person 2 by the predetermined distance in the opposite direction to the predetermined direction and from which unmanned aircraft 1B can blow wind 3 to suspicious person 2. From such position, unmanned aircraft 1B may blow wind 3 toward the direction of suspicious person 2, i.e., the predetermined direction. This causes suspicious person 2 to move way in the predetermined direction.

The case where suspicious person 2 is wished to move away in the predetermined direction from the current position of suspicious person 2 is, for example, that suspicious person 2 is present near an area or an object which is undesired to be approached by suspicious person 2. This applies more specifically to the case where the position of an area or an object which is undesired to be approached by suspicious person 2 is previously stored in memory 12, and the position of suspicious person 2 is near such position.

Note that the strength and so forth of wind 3 to be blown may be changed depending on the position of suspicious person 2 after being subjected to wind 3. For example, when no change has occurred in the position of suspicious person 2 despite that unmanned aircraft 1B has subjected suspicious person 2 to wind 3, unmanned aircraft 1B may control wind 3 so that suspicious person 2 will be subjected to stronger wind 3. Unmanned aircraft 1B achieves this, for example, by moving closer to suspicious person 2 than the last time unmanned aircraft 1B blew wind 3 and by blowing wind 3 from such position. This subjects suspicious person 2 to stronger wind 3, prompting the movement of suspicious person 2.

In another example, unmanned aircraft 1B may subject suspicious person 2 to wind 3 again when no change has occurred in the position of suspicious person 2 despite that unmanned aircraft 1B has subjected suspicious person 2 to wind 3. Unmanned aircraft 1B may also repeat the operation of subjecting suspicious person 2 to wind 3. In particular, flight controller 114 may continuously perform the wind-blow control while the position of suspicious person 2 is within the predetermined distance from entry prohibited area 4. Unmanned aircraft 1B may also increase the frequency of subjecting suspicious person 2 to wind 3. This enables wind 3 to be blown to suspicious person 2 for a plural number of times, prompting the movement of suspicious person 2.

Similarly, when wishing to cause suspicious person 2 to move closer toward the predetermined direction from the current position of suspicious person 2, unmanned aircraft 1B may move to a position which is spaced apart from the position of suspicious person 2 by the predetermined distance in the opposite direction to the predetermined direction and from which unmanned aircraft 1B can blow wind 3 to suspicious person 2. From such position, unmanned aircraft 1B may blow wind 3 toward the direction of suspicious person 2, i.e., the predetermined direction. This causes suspicious person 2 to move closer toward the predetermined direction.

The case where suspicious person 2 is wished to move toward the predetermined direction from the current position of suspicious person 2 is, for example, that suspicious person 2 is to be directed to the waiting place for security guards. In this case, the waiting place for security guards is previously stored in memory 12, and unmanned aircraft 1B directs suspicious person 2 to the direction of the waiting place. A security guard is not always present in the waiting place for security guards, and thus unmanned aircraft 1B may direct suspicious person 2 to the waiting place only when a security guard is present in the waiting place. When unmanned aircraft 1B previously knows the time period during which a security guard is present in the waiting place, time information on such time period is stored, based on which unmanned aircraft 1B can determine whether a security guard is present in the waiting place. In this case, unmanned aircraft 1B has the function of time measurement. Alternatively, unmanned aircraft 1B may obtain information indicating whether a security guard is present in the waiting place from an external device via communication unit 105, thereby determining whether a security guard is present in the waiting place. For example, unmanned aircraft 1B may obtain the position of a portable terminal carried by the security guard and determine whether the security guard is present in the waiting place based on whether the obtained position corresponds to a position in the waiting place for security guards.

Note that when no waiting place, etc. for security guards is present, for example, and a security guard needs to rush from an external location to the building to which suspicious person 2 has entered, unmanned aircraft 1B may direct suspicious person 2 toward the position of the security guard. In this case, unmanned aircraft 1B obtains the position of a portable terminal carried by the security guard and directs suspicious person 2 toward such position. When directing suspicious person 2 toward the position of the security guard, unmanned aircraft 1B may notify the security guard of that unmanned aircraft 1B will direct suspicious person 2 toward the position of the security guard. For the possible case where the security guard will move, unmanned aircraft 1B may regularly check the position of the security guard to correct the direction in which suspicious person 2 will be directed. When unmanned aircraft 1B directs suspicious person 2 to the position of the security guard who has not arrived at the site yet, for example, suspicious person 2 can move to the outside of the building to which suspicious person 2 has entered and escape. For this reason, unmanned aircraft 1B may direct suspicious person 2 to the position of the security guard, only when such position is within a range to which suspicious person 2 can be directed, such as inside of the building to which suspicious person 2 has entered.

Note that unmanned aircraft 1B may change the frequency of blowing wind 3 to suspicious person 2 or the strength of wind 3 depending on situations. For example, unmanned aircraft 1B may change the frequency of blowing wind 3 to suspicious person 2 or the strength of wind 3 depending on the distance from entry prohibited area 4 to suspicious person 2. When the distance from entry prohibited area 4 to suspicious person 2 is small, i.e., when suspicious person 2 is present close to entry prohibited area 4, unmanned aircraft 1B can strongly prompt suspicious person 2 to move away by increasing the strength of wind 3 or the frequency of blowing wind 3. Meanwhile, when the distance from entry prohibited area 4 to suspicious person 2 is large, i.e., when suspicious person 2 is distant from entry prohibited area 4, entry prohibited area 4 has a small risk of being entered by suspicious person 2. Unmanned aircraft 1B will not thus increase the strength of wind 3 or the frequency of blowing wind 3.

Note that Embodiment 3 has described an example in which unmanned aircraft 1B directly blows wind 3 to suspicious person 2, but unmanned aircraft 1B may use wind 3 to intimidate suspicious person 2, without blowing wind 3 to suspicious person 2.

By moving around the position determined by movement prohibition position determiner 113, for example, unmanned aircraft 1B can subject the surroundings of the position determined by movement prohibition position determiner 113 to wind 3, giving an effect of wind 3 on a stuff located in the surrounding area. Through this, for example, a lightweighted stuff is drifted up in the air and some stuffs contact with each other to make noise. Also, wind 3 is reflected at the ground, a wall, an object, or others to indirectly subject suspicious person 2 to wind 3.

That unmanned aircraft 1B moves around the position determined by movement prohibition position determiner 113 may refer to, for example, that unmanned aircraft 1B moves in the left-right direction, the front-back direction, or the up-down direction within a predetermined range around the position determined by movement prohibition position determiner 113. Another example is that an area around the position determined by movement prohibition position determiner 113 is fixed, and unmanned aircraft 1B moves along a predetermined route, along which unmanned aircraft 1B can blow wind 3 toward such area.

Note that when the position of unmanned aircraft 1B is greatly distant from the position determined by movement prohibition position determiner 113, unmanned aircraft 1B will not be able to prohibit the movement of suspicious person 2. For this reason, the effect of wind 3 may be increased within the predetermined range. The range within which the effect of wind 3 is increased may be determined depending on the distance between the position determined by movement prohibition position determiner 113 and suspicious person 2. When the distance between the position determined by movement prohibition position determiner 113 and suspicious person 2 is small, for example, enlargement of the range within which the effect of wind 3 is increased can lead to the failure to prohibit the movement of suspicious person 2. In this case, the range within which the effect of wind 3 is increased may be reduced.

Note that unmanned aircraft 1B may switch between directly subjecting suspicious person 2 to wind 3 and using wind 3 to intimidate suspicious person 2 without subjecting suspicious person 2 to wind 3, in accordance with a predetermined condition. For example, unmanned aircraft 1B may determine to use wind 3 to intimidate suspicious person 2 without subjecting suspicious person 2 to wind 3, when the distance between suspicious person 2 and unmanned aircraft 1B is greater than a predetermined distance, while determining to directly subjecting suspicious person 2 to wind 3 when the distance between suspicious person 2 and unmanned aircraft 1B is equal to or less than the predetermined distance.

Note that Embodiment 3 has described an example in which unmanned aircraft 1B blows wind 3 to suspicious person 2 to prohibit the movement of suspicious person 2, but unmanned aircraft 1B may blow wind 3 to cause suspicious person 2 to move from the current position of suspicious person 2 to any different position. For example, when suspicious person 2 is in front of a safe box in an attempt to open it, for example, suspicious person 2 may be desired to move from the front position of the safe box to any different position. In such case, unmanned aircraft 1B moves to the air above suspicious person 2 and blows wind 3 to suspicious person 2 so as to cause suspicious person 2 to move from the front position of the safe box to any different position. To achieve this, unmanned aircraft 1B previously stores in memory 12 places where the presence of suspicious person 2 is undesired, such as places where the presence of suspicious person 2 is not allowed, and moves to the air above suspicious person 2 when determining that the position of suspicious person 2 corresponds to any of such places. This will be described below with reference to FIG. 18.

Figure 18:
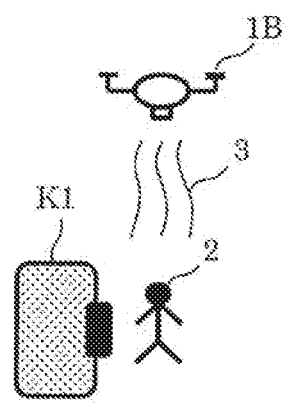
FIG. 18 is a conceptual diagram showing an image of an operation performed by the unmanned aircraft according to Embodiment 3 of blowing wind to the suspicious person in front of a safe box.

FIG. 18 is a conceptual diagram showing an image of an operation performed by unmanned aircraft 1B according to Embodiment 3 of blowing wind 3 to suspicious person 2 who is in front of safe box K1. FIG. 18 illustrates a situation in which unmanned aircraft 1B is blowing wind 3 toward suspicious person 2 who is in front of safe box K1 from the air above suspicious person 2. When blowing wind 3 from immediately above suspicious person 2 as illustrated, unmanned aircraft 1B does not have to tilt the aircraft body and move, thereby continuously subjecting suspicious person 2 to wind 3.

Note that unmanned aircraft 1B may blow wind 3 to suspicious person 2 when determining that the direction in which suspicious person 2 is to move is a predetermined direction. Note that the method described in Embodiment 2 serves as a method of identifying the direction in which suspicious person 2 is to move.

Embodiment 3 has described a non-limited example in which unmanned aircraft 1B includes four propellers, and thus the present disclosure is applicable to an unmanned aircraft having any number of propellers.

Note that the surveillant, etc. may be able to set the direction in which wind 3 is blown to suspicious person 2. In such case, to enable wind 3 to be blown to suspicious person 2 from an effective direction, information on entry prohibited area 4 or an area to which suspicious person 2 is to be directed may be displayed on a terminal of the surveillant, etc. Alternatively, information may be displayed together indicating from which position and in which direction wind 3 is effectively blown, on the basis of these areas.

Also, a condition of when to blow wind 3 to suspicious person 2 may be set. For example, wind 3 may be blown to suspicious person 2 when suspicious person 2 is approaching unmanned aircraft 1B at the movement prohibition position. Also, a condition of when to control the way of blowing wind 3 to suspicious person 2 may be set. For example, wind 3 may be controlled so that it will be blown strongly to suspicious person 2, when no change has occurred in the position of suspicious person 2 despite that suspicious person 2 has been subjected to wind 3.

Note that how the positions of suspicious person 2 changed may be displayed on the terminal of the surveillant, etc. before and after wind 3 is blown to suspicious person 2 or before and after the control on wind 3 has been changed. This enables the surveillant, etc. to judge whether wind 3 is working effectively on suspicious person 2. Alternatively, image information on suspicious person 2 before and after these changes may also be displayed.

To enable the surveillant, etc. to determine whether to use wind 3 to perform an operation of intimidating suspicious person 2, video information on the surroundings of the area immediately below unmanned aircraft 1B may be transmitted to the terminal of the surveillant, etc. This enables the surveillant, etc. to check whether there is any stuff to be scattered by wind 3 around the area immediately below unmanned aircraft 1B, and thus reduces the failure of effectively intimidating suspicious person 2 due to the absence of stuffs to be scattered by wind 3.

Effect

As described above, according to Embodiment 3, unmanned aircraft 1B moves to the position at which unmanned aircraft 1B will prohibit the movement of suspicious person 2, and further controls wind 3 so that wind 3 generated by a flight operation will be blown to suspicious person 2, when suspicious person 2 is approaching (more specifically, the tilt and so forth of unmanned aircraft 1B is controlled). Unmanned aircraft 1B is thus capable of prohibiting the movement of suspicious person 2.

Embodiment 4

Embodiment 4 will describe an example in which the unmanned aircraft directs a moving object toward a different direction from the direction toward an entry prohibited area. An entry prohibited area in Embodiment 4 is a dangerous area for a moving object, such as an area where a fire is breaking out and a harmful gas, etc. is generated, or an area that is in danger of collapse because of an earthquake and so forth.

Unmanned aircraft 1 according to Embodiment 4 further includes a dangerous area information obtainer, a presentation controller, and a presentation unit, in addition to the components of unmanned aircraft 1 shown in FIG. 2. The other components are the same as those of Embodiment 1, and thus their descriptions will be omitted.

The dangerous area information obtainer obtains dangerous area information by communication. More specifically, the dangerous area information obtainer obtains information indicating the position of an area that is detected as being in danger by a danger detection sensor installed in a building (e.g., fire detection sensor). Note that the dangerous area information obtainer may obtain dangerous area information by determining whether a sensing area is a dangerous area on the basis of the sensing data. For example, the dangerous area information obtainer analyzes an image outputted from the camera included in unmanned aircraft 1 to determine whether the imaging area of the camera is a dangerous area.

The movement prohibition position determiner uses the dangerous area information to determine the flight position (hereinafter also referred to as directing position) at which the entry of the moving object to the dangerous area will be prohibited. More specifically, the movement prohibition position determiner determines a position between the moving object and the dangerous area as a directing position. The movement prohibition position determiner may further obtain a recommended route for the moving object and determine the directing position on the basis of the dangerous area information and the recommended route. For example, the movement prohibition position determiner obtains by communication an evacuation route for avoiding dangers in the dangerous area as a recommended route. The movement prohibition position determiner then determines, as the directing position, a position that is located between the moving object and the dangerous area and that does not obstruct the evacuation route. This enables the moving object, i.e., a person who is evacuating, to avoid the dangerous area and move to the evacuation area without being lost. The directing position may be an intersecting point of the recommended route and the route from the moving object to the dangerous area. This enables the person who is evacuating to avoid dangers and evacuate in the shortest time/distance. Unmanned aircraft 1 may calculate a recommended route.

When a plurality of recommended routes are available, the directing position that is the most distant from the dangerous area may be selected from among directing positions calculated for the respective recommended routes. Alternatively, the route of the shortest travel distance may be selected from among a plurality of recommended routes. In these cases, the safety of the moving object is enhanced because the selected route is far from the dangerous area or requires shorter travel time.

Also, the directing position may be adjusted in accordance with the time that has elapsed from the occurrence of a danger. For example, a position that is further from the dangerous area may be determined as the directing position as the time elapsed from the occurrence of the danger is longer. Instead of or together with the time elapsed, the directing position may also be adjusted in accordance with an increase in the danger. For example, when unmanned aircraft 1 has detected smoke, spark, or another stuff that affects an increase in the danger, a position that is still further from the dangerous area may be determined as the directing position.

At the destination position at which the entry of the moving object to the dangerous area will be prohibited, the presentation controller causes the presentation unit to perform presentation for directing the moving object to a different direction from the direction that leads from the moving object toward the dangerous area. More specifically, the presentation controller causes the presentation unit to present the direction that leads from the position of the moving object toward the recommended route. As described above, unmanned aircraft 1 not only moves to a position between the dangerous area and the moving object, but also presents the destination to which the moving object should move, thereby more reliably preventing the moving object from entering the dangerous area.

The presentation controller may also cause the presentation unit to present the reason of prohibiting the moving object from entering the dangerous area. This enables the moving object, when such moving object is a person, to understand the presented reason and thus makes it easier to have the moving object follow the presented direction.

The presentation controller may also change presentation modes in accordance with the distance between the moving object and unmanned aircraft 1 or the directing position. For example, the presentation controller changes the means of presentation from display to sound output, when the distance between the moving object and unmanned aircraft 1 or the directing position becomes smaller than the threshold. Alternatively, another means of presentation may be added. For example, sound output may be added to display. Alternatively, the means of presentation may be changed and another means of presentation may be added. For example, the means of presentation may be changed from display to sound output, and the blast of liquid, gas, or the like may further be added.

The presentation controller may also change presentation modes in accordance with the distance between the moving object or unmanned aircraft 1 and the dangerous area. For example, the presentation controller changes the presentation means from display to a combination of sound output and blast of liquid, gas, or the like, when the distance between the moving object or unmanned aircraft 1 and the dangerous area becomes smaller than the threshold.

The presentation unit is a presentation device that performs presentation on the basis of an instruction from the presentation controller. More specifically, the presentation unit may be a display unit such as a light emitting diode (LED), a display, and a projector, or may be a posting unit such as a banner and a board. Note that the presentation unit may perform presentation to the moving object by blasting liquid or gas. Note that the presentation unit may be located outside of unmanned aircraft 1 to be connected to unmanned aircraft 1 by communication. Stated differently the presentation unit may be installed in unmanned aircraft 1 or may be located around unmanned aircraft 1.

Variation of Embodiment 4

An entry prohibited area according to the present variation is a private area that is off-limits to those who are not authorized.

Unmanned aircraft 1 according to Embodiment 4 includes a private area information obtainer and an authorized person identifier, instead of the dangerous area information obtainer. The other components are the same as those of Embodiment 4, and thus their descriptions will be omitted.

The private area information obtainer obtains private area information by communication. More specifically, the private area information obtainer obtains information indicating a room in a facility that allows the entry of only an authorized person such as a member of staff of an event held in the facility.

The authorized person identifier identifies whether a person approaching the private area is an authorized person. More specifically, the authorized person identifier obtains an image of the surroundings of the private area, and identifies whether a person on the image is an authorized person. Alternatively, the authorized person identifier may receive information transmitted from a tag worn by an authorized person to identify whether such person is an authorized person from the received information.

Note that the authorized person identifier may be implemented by a combination with another device that is different from unmanned aircraft 1. In this case, unmanned aircraft 1 obtains the result of identification performed by another device of whether the person is an authorized person, and determines whether the person who has been recognized by use of an image and so forth is the identified person. The method performed by another device to identify whether a person is an authorized person may be an identification method that utilizes biological information (e.g., fingerprint, iris)

The movement prohibition position determiner uses the private area information to determine the flight position (directing position) at which the entry by the moving object to the private area will be prohibited. More specifically, the movement prohibition position determiner determines a position between the moving object and the private area as the directing position.

The flight controller controls the movement of unmanned aircraft 1 depending on whether a person approaching the private area is an authorized person. More specifically, when the person approaching the private area has not been identified as an authorized person, the flight controller causes unmanned aircraft 1 to move to the directing position and hover at the directing position. When the person approaching the private area has been identified as an authorized person, the flight controller causes unmanned aircraft 1 not to move or move to a position other than the directing position.

The presentation controller controls the presentation of the presentation unit depending on whether a person approaching the private area is an authorized person. More specifically, the presentation controller controls the presentation of a direction toward which the person approaching the private area is to be directed, depending on whether such person is an authorized person. For example, when the person approaching the private area has not been identified as an authorized person, the presentation controller causes the presentation unit to perform presentation that directs such person to a different direction from the direction that leads from such person toward the private area. For example, the presentation controller causes the presentation unit to perform presentation that directs the person to an area different from the private area (e.g., the event venue). When the person approaching the private area has been identified as an authorized person, the presentation controller causes the presentation unit to perform presentation that directs such person to the direction that leads from such person toward the private area.

The presentation controller may control whether to or not to perform presentation depending on whether a person approaching the private area is an authorized person. For example, when the person approaching the private area has not been identified as an authorized person, the presentation controller causes the presentation unit to perform presentation that directs such person to a different direction from the direction that leads from such person toward the private area. Meanwhile, when the person approaching the private area has been identified as an authorized person, the presentation controller causes the presentation unit not to perform presentation.

Other Embodiments

The unmanned aircraft according to one or more aspects of the present disclosure has been described above on the basis of the embodiments, but the present disclosure is not limited to these embodiments. The range of one or more aspects of the present disclosure may include a variation achieved by making various modifications and alternations to each of the embodiments that can be conceived by those skilled in the art without departing from the essence of the present disclosure, or an aspect achieved by combining components in different embodiments.

For example, in the above descriptions of Embodiments 1 through 3, the moving object detected by the unmanned aircraft according to the present disclosure is suspicious person 2, but the present disclosure is not limited to this. The unmanned aircraft according to the present disclosure may also be used at the time of disaster, for example, and thus the moving object may be a disaster victim, a searcher, or another. In this case, entry prohibited area 4 is an dangerous area, etc. in the disaster-stricken area.

Also, the predetermined distance and the predetermined range described in the above embodiments are determined as appropriate depending on, for example, environment and so forth in which the unmanned aircraft according to the present disclosure is used.

The present disclosure is implemented, for example, not only as an unmanned aircraft, but also as a control method that includes steps (processes) performed by components included in the unmanned aircraft.

As shown in FIG. 5, such control method is a control method of controlling an unmanned aircraft. Such control method includes: detecting a moving object based on a result of sensing performed by a sensor that performs sensing of an external environment of the unmanned aircraft (step S02); obtaining area information indicating an area, entry to which by the moving object is undesirable (step S04); and causing the unmanned aircraft to move to a position between the moving object and the area indicated by the area information, based on a positional relation between the moving object and the area, and fly at the position that is a destination position (steps S05 and S06).

The steps of such control method may be executed, for example, by a computer (computer system). The present disclosure is implemented as a program that causes the computer to execute the steps included in the control method. The present disclosure is further implemented as a non-transitory, computer-readable recording medium, such as a CD-ROM, that stores such program.

When the present disclosure is implemented as a program (software), for example, each step is executed by executing the program by use of hardware resources of the computer, such a CPU, a memory, an input-output circuit, and so forth. Stated differently, each step is executed by the CPU obtaining data from the memory or the input-output circuit and so forth for calculation and outputting the calculation result to the memory or the input-output circuit and so forth.

Moreover, in each of the above embodiments, the components included in the unmanned aircraft may be implemented as dedicated hardware or may be achieved by executing a software program suited to such components. Alternatively, the components may be implemented by a program executor such as a CPU or a processor reading out and executing the software program recorded in a recording medium such as a hard disk or a semiconductor memory.

Note that one or more, or all of the functions of the unmanned aircraft according the embodiments of the present disclosure are implemented as an LSI, which is typically an integrated circuit. They may take the form of individual chips, or one or more, or all of the functions may be encapsulated into a single chip. The way of integration into a circuit is not limited to LSI integration. The functions of the unmanned aircraft according to the embodiments of the present disclosure thus may be implemented as a dedicated circuit or a general-purpose processor. A field programmable gate array (FPGA) that is programmable after the manufacture of an LSI, or a reconfigurable processor that allows for reconfiguration of the connection and the settings of circuit cells inside an LSI may be employed.

One or more, or all of the functions of the unmanned aircraft according to the embodiments of the present disclosure may be implemented by a processor such as a CPU executing the program.

Also, the numerics used in the above description are all examples to specifically explain the present disclosure, and thus the present disclosure is not limited to such example numerics.

Also, the order of executing steps shown in FIG. 5, FIG. 9, and FIG. 13 are examples to specifically explain the present disclosure, and thus orders other than the above-described orders may be used within a range in which a similar effect is achieved. One or more of the steps may also be executed concurrently with another step (e.g., in parallel).

The present disclosure also includes variations achieved by making modifications to the embodiments according to the present disclosure that can be conceived by those skilled in the art without departing from the essence of the present disclosure.

INDUSTRIAL APPLICABILITY

The present disclosure is applicable to an unmanned aircraft that generates wind by performing a flight operation and prevents the movement of a person.

What is claimed is:
1. An unmanned aircraft, comprising:
  a sensor that performs sensing of an external environment of the unmanned aircraft;
  a processor;

a memory that stores a program, wherein when the program is executed by the processor, the program causes the processor to execute:
detecting a suspicious person being in a building based on a result of the sensing performed by the sensor;
obtaining area information indicating an area in the building, entry to which by the suspicious person is undesirable;
identifying a route, within the building, which leads from a position of the suspicious person being in the building to the area, wherein the route is identified using map information indicating an inside of the building;
determining, based on a positional relation between the position of the suspicious person and the area indicated by the area information, a second place as a destination place to which the unmanned aircraft is to move, the second place being within a first predetermined distance from a first place, and being located between the first place and the suspicious person, the first place being a place of which width is the narrowest among one or more places, within the building, included in the route, the first place being one at which the suspicious person has not yet arrived, wherein the second place is one of the one or more places included in the route within the building, and the second place is one at which the suspicious person has not yet arrived; and
causing the unmanned aircraft to move to a destination position above the second place determined as the destination place, and hover at the destination position
causing the unmanned aircraft to move to the destination position only when the position of the suspicious person is within a second predetermined distance from the area.

2. The unmanned aircraft according to claim 1, wherein the program causes the processor to further execute:
when the area comprises a plurality of areas, performing processing of selecting a specific one of the plurality of areas that corresponds to the position of the suspicious person; and
identifying, based on the map information, the route, within the building, which leads the suspicious person from the position of the suspicious person to the specific one of the plurality of areas.

3. The unmanned aircraft according to claim 1, wherein the program causes the processor to further execute:
causing the unmanned aircraft to move to the destination position based on the positional relation and a direction in which the suspicious person is to move.

4. The unmanned aircraft according to claim 3, wherein the program causes the processor to further execute:
causing the unmanned aircraft to move to the destination position only when the direction is toward the area.

5. The unmanned aircraft according to claim 3, wherein the program causes the processor to further execute:
causing the unmanned aircraft to move to the destination position only when the moving object has moved in the direction.

6. The unmanned aircraft according to claim 1, wherein the program causes the processor to further execute:
further performing wind-blow control for controlling the unmanned aircraft to cause wind generated by flight of the unmanned aircraft to be blown to the suspicious person, when the suspicious person is approaching the unmanned aircraft.

7. The unmanned aircraft according to claim 6, wherein the program causes the processor to further execute:
further adjusting the wind-blow control, based on changes in the position of the suspicious person after performing the wind-blow control.

8. The unmanned aircraft according to claim 6, wherein the program causes the processor to further execute:
preforming the wind-blow control when the position of the suspicious person is within a second predetermined distance from the area.

9. The unmanned aircraft according to claim 8, wherein the program causes the processor to further execute:
continuously performing the wind-blow control while the position of the suspicious person is within the second predetermined distance from the area.

10. The unmanned aircraft according to claim 1, wherein the program causes the processor to further execute:
causing a presentation device to perform presentation for directing the suspicious person toward a different direction from a direction that leads from the suspicious person toward the area,
wherein the presentation device is included in the unmanned aircraft or located around the unmanned aircraft, and
the presentation device includes a display that displays information for directing the suspicious person to move in the different direction.

11. A control method of controlling an unmanned aircraft, the control method comprising:
detecting a suspicious person being in a building based on a result of sensing performed by a sensor that performs sensing of an external environment of the unmanned aircraft;
obtaining area information indicating an area in the building, entry to which by the suspicious person is undesirable;
identifying a route, within the building, which leads from a position of the suspicious person being in the building to the area, wherein the route is identified using map information indicating an inside of the building;
determining, based on a positional relation between the position of the suspicious person and the area indicated by the area information, a second place as a destination place to which the unmanned aircraft is to move, the second place being within a first predetermined distance from a first place, and being located between the first place and the suspicious person, the first place being a place of which width is the narrowest among one or more places, with in the building, included in the route, the first place being one at which the suspicious person has not yet arrived, wherein the second place is one of the one or more places included in the route within the building, and the second place is one at which the suspicious person has not yet arrived; and
causing the unmanned aircraft to move to a destination position above the second place determined as the destination place, and hover at the destination position causing the unmanned aircraft to move to the destination position only when the position of the suspicious person is within a second predetermined distance from the area.

12. A non-transitory computer-readable recording medium having recorded thereon a program that causes a computer to execute the control method according to claim 11.

13. The unmanned aircraft according to claim 10, wherein the presentation device further includes:
   a sound output apparatus that outputs a sound for directing the suspicious person to move in the different direction,
   wherein the display displays the information when a distance between the position of the suspicious person and the predetermined place is equal to or greater than a threshold, and
   the sound output apparatus outputs the sound when the distance is smaller than the threshold.

14. The unmanned aircraft according to claim 13, wherein the presentation device further includes:
   a blast apparatus that blasts liquid or gas for directing the suspicious person toward the different direction,
   wherein the blast apparatus blasts the liquid or the gas when the distance is smaller than the threshold.

15. The unmanned aircraft according to claim 1, wherein the first place is a place provided with a door.

* * * * *